(12) United States Patent
Minoura

(10) Patent No.: US 6,433,847 B1
(45) Date of Patent: Aug. 13, 2002

(54) REFLECTION LIQUID CRYSTAL DISPLAY WHICH INCLUDES A PAIR OF SUBSTRATES

(75) Inventor: Kiyoshi Minoura, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/447,818

(22) Filed: Nov. 24, 1999

(30) Foreign Application Priority Data

Nov. 27, 1998 (JP) .......................................... 10-337453
Nov. 18, 1999 (JP) .......................................... 10-328808

(51) Int. Cl.⁷ .......................................... G02F 1/1335
(52) U.S. Cl. ..................................................... 349/113
(58) Field of Search .......................... 349/62, 67, 113, 349/86

(56) References Cited

U.S. PATENT DOCUMENTS

| | | | | |
|---|---|---|---|---|
| 3,891,309 A | * | 6/1975 | Bonne | 350/160 R |
| 4,095,217 A | * | 6/1978 | Tani et al. | 340/324 |
| 5,818,554 A | * | 10/1998 | Hiyama et al. | 349/67 |
| 5,841,496 A | * | 11/1998 | Itoh et al. | 349/113 |
| 6,147,728 A | * | 11/2000 | Okumura et al. | 349/106 |

FOREIGN PATENT DOCUMENTS

| | | |
|---|---|---|
| JP | 5134266 A | 5/1993 |
| JP | 6317702 A | 11/1994 |
| JP | 7104250 A | 4/1995 |
| JP | 7159778 A | 6/1995 |
| JP | 08-087009 A | * 4/1996 ......... G02F/1/1335 |
| JP | 8320480 A | 12/1996 |
| JP | 9090352 A | 4/1997 |
| JP | 9281477 A | 10/1997 |
| JP | 10010528 A | 1/1998 |
| JP | 10020290 A | 1/1998 |

* cited by examiner

*Primary Examiner*—Toan Ton
*Assistant Examiner*—Andrew Schechter

(57) ABSTRACT

A reflection-type liquid crystal display device includes: a pair of substrates; a liquid crystal layer sandwiched between the pair of substrates; and a reflection plane provided at least partially on one of the pair of substrates or at least partially on a substrate adjacent to one of the pair of substrates, the reflection plane being inclined toward an opposite side of an user, and the reflection-type liquid crystal display device is arranged such that an inner product of (a) a regular projection vector of a normal vector of the reflection plane onto a display plane and (b) a regular projection vector of a vector in a direction from the reflection-type liquid crystal display device toward the user is not more than 0, and a tilt angle made by at least a portion of the reflection plane with respect to a horizontal plane of the pair of substrates is not less than $\theta$ and less than $2\times\theta$ as defined by an equation $\theta = \frac{1}{2} \times \arcsin(n0/n1)$ where $n0$ is a refractive index of atmosphere, and $n1$ is a refractive index of a substance for leveling an inclined plane. With this arrangement, it is possible to provide a reflection-type liquid crystal display device having high brightness in a white display, which is capable of clear multi-color display with a high contrast ratio, and which can be manufactured with high productivity.

24 Claims, 18 Drawing Sheets

PANEL UPPER SIDE

PANEL LOWER SIDE

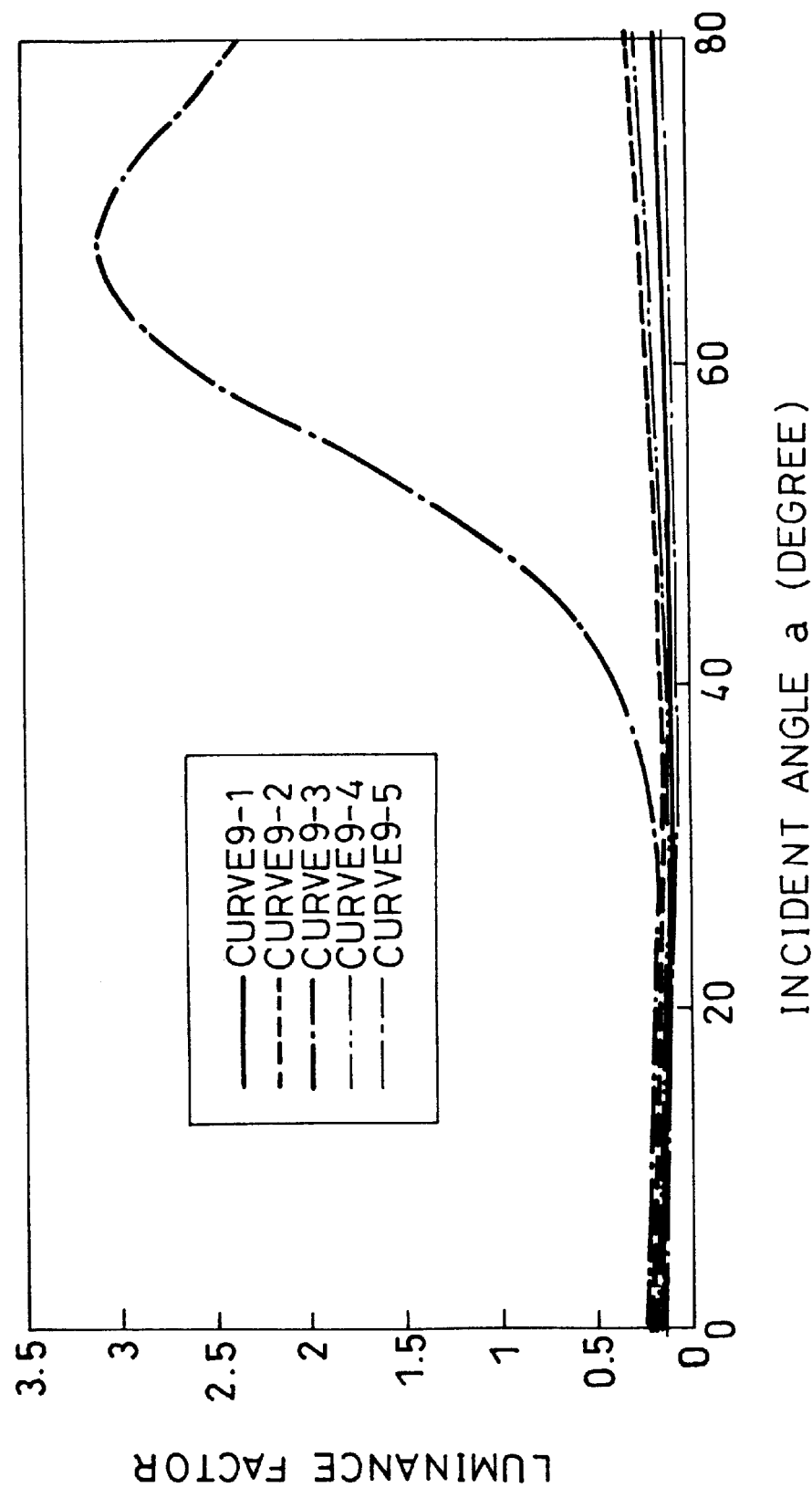

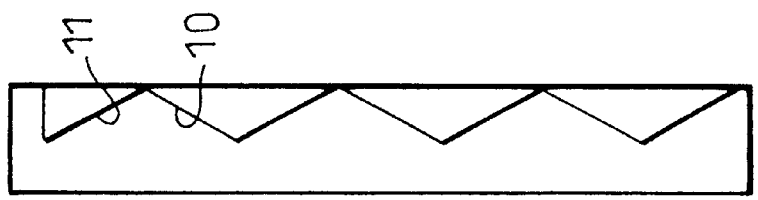
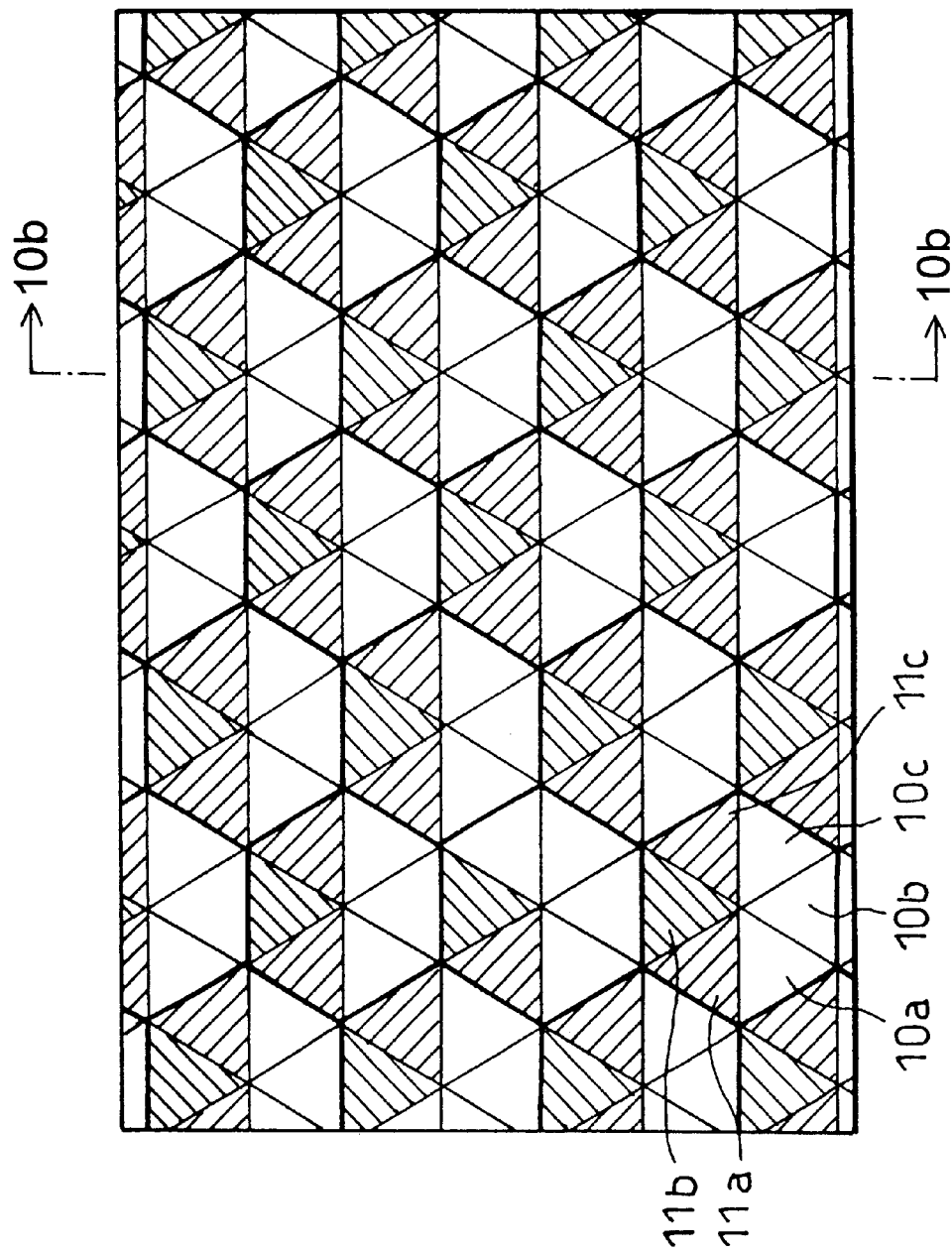

REFLECTION LIQUID CRYSTAL DISPLAY WHICH INCLUDES A PAIR OF SUBSTRATES

FIELD OF THE INVENTION

The present invention relates to a reflection-type liquid crystal display device, and in particular to a reflection-type liquid crystal display device which carries out display without a polarizing plate.

BACKGROUND OF THE INVENTION

Currently, liquid crystal display devices have been in wide use as a color display with thin and light weight features, for example. In particular, a reflection-type liquid crystal display device, since it does not require a backlight, has a feature which allows the power required for a light source and also a space and weight of the backlight to be reduced. Thus, the reflection-type liquid crystal display device is suitable for devices which are desired to be made light and thin.

As for contrast characteristics of the display, a large decrease in contrast ratio is observed in CRT, etc., in outside day light. Also, as with CRT, in the case where the intensity of surrounding light is much greater than the display light, for example, as in the case of under direct sun light, a large reduction in contrast ratio is inevitable even in a transmissive liquid crystal display device which has been subjected to a low reflection treatment. In contrast, the reflection-type liquid crystal display device can have a display light which is proportional to the quantity of the surrounding light, and therefore is suitable particularly as a portable information terminal device, digital camera, and portable video camera, etc., when they are used outside.

As described, the reflection-type liquid crystal display device has very promising applications in many fields, yet, to this date, no reflection-type liquid crystal display device which can withstand practical use has been developed for the reasons of insufficient performance, for example, in contrast ratio, reflectance, full-color display, and a response to high-definition display and motion images.

The following describes the reflection-type liquid crystal display device in more detail.

A conventional liquid crystal display device using a twist nematic (TN mode) has the arrangement in which a pair of polarizing plates are used, and while it excels in characteristics of contrast ratio and viewing angle dependence, the reflectance is intrinsically low. Also, because a liquid crystal modulation layer and light reflecting layer are separated by the thickness of a substrate, etc., there occurs parallax due to a shift in optical paths of the incident illumination light and outgoing reflected light.

A liquid crystal display device employing a birefringence mode which carries out display by controlling the birefringence of the liquid crystal layer by an electric field ("ECB mode" hereinafter), or a mixed mode in combination of the TN mode and ECB mode allows an arrangement including a single polarizing plate, in which reflectance can be improved while maintaining the advantage of a high contrast ratio of the liquid crystal display device employing only the TN mode. However, such a liquid crystal display device has the problem of poor viewing angle characteristic and coloration in a white display which is caused by wavelength dependence. Further, since a polarizing plate is still used, the utilizing efficiency of the light is inevitably reduced in half or less.

In view of these drawbacks, there has been developed a guest-host liquid crystal element in which the liquid crystal is pigmented in the system with no polarizing plate ("GH" hereinafter). However, this device has the problems that it is less reliable by the pigment added and that a high contrast ratio cannot be achieved due to a low dichromatic ratio of the pigment. In particular, a lack of contrast greatly reduces the color purity in a color display using a color filter, which requires the use of a color filter having high color purity. However, the use of such a color filter having high color purity reduces brightness by the color filter provided, posing the problem that the advantage of high brightness of this system as realized by the omission of the polarizing plate is lost.

On these background, there has been developed a liquid crystal display device in the system employing a polymer-dispersed type liquid crystal, for which high brightness and high contrast display can be expected.

This system utilizes the switching characteristic of optical transmissive state and scattering state of the polymer dispersed-type liquid crystal, which states are switched by controlling a voltage applied to the polymer dispersed-type liquid crystal. This system does not use the polarizing plate and the utilizing efficiency of light can be increased. Further, in this system, in evaluation from a view of color quality, a desirable white display can be expected because of relatively small wavelength dependence as compared with that of the ECM mode and because it is free from the problem of absorption profile of the polarizing plate itself (i.e., characteristic of the polarizing plate which absorbs blue light and the incident light becomes yellowish).

For example, Japanese Unexamined Patent Publication No. 104250/1995 (Tokukaihei 7-104250) (Published Date:Apr. 21, 1995) discloses a liquid crystal display device employing such a system, in which polymer dispersed-type liquid crystal is arranged on a black substrate. In this liquid crystal display device, the polymer dispersed-type liquid crystal will be in the scattering state when no voltage is applied, by which the liquid crystal becomes "nebular" and a white display is realized, and the polymer dispersed-type liquid crystal will be in the transmissive state when a voltage is applied, by which the black substrate provided underneath becomes visible and a black display is realized, thereby realizing a monochromatic display.

Japanese Unexamined Patent Publication No. 10528/1998 (Tokukaihei 10-10528) (Published Date:Jan. 16, 1998) discloses a reflection-type liquid crystal display device in which a polymer dispersed-type liquid crystal is provided on a reflecting plate whose reflectance is non-uniform and periodic.

Japanese Unexamined Patent Publication No. 90352/1997 (Tokukaihei 9-90352) (Published Date:Apr. 4, 1997) discloses a liquid crystal display element having an arrangement in which a reflecting medium with a tilt angle with respect to a substrate surface is periodically provided on a light absorbing medium, on which is further provided a polymer dispersed-type liquid crystal adjacent to the reflecting medium. In this system too, a white display is realized by utilizing the scattering state of the polymer dispersed-type liquid crystal when no voltage is applied, and a. black display is realized by utilizing the transmissive state of the polymer dispersed-type liquid crystal when a voltage is applied and by absorption of light into the light absorbing medium.

The above publication (Tokukaihei 9-90352) uses the reflecting medium with a shape which is not flat but with a tilt angle with respect to the substrate surface. Japanese Unexamined Patent Publication No. 20290/1998

(Tokukaihei 10-20290) (Published Date:Jan. 23, 1998) discloses a liquid crystal display device including a reflecting medium which is characterized by its pyramid shape or cone shape.

Further, Japanese Unexamined Patent Publication No. 134266/1993 (Tokukaihei 5-134266) (Published Date:May 28, 1993) discloses a display element in which a liquid crystal layer and a polymer material layer are deposited, and which utilizes reflection by interference based on a difference in refractive indices of the two layers and the distance of each layer.

Japanese Unexamined Patent Publication No. 281477/1997 (Tokukaihei 9-281477) (Published Date:Oct. 31, 1997) discloses a reflection-type direct viewing color display device using a hologram which splits incident white light with a predetermined angle by dispersion.

Further, Japanese Unexamined Patent Publication No. 320480/1996 (Tokukaihei 8-320480) (Published Date:Dec. 3, 1996) discloses a color display device with the feature of a light absorbing color filter and a light reflecting color filter deposited.

Japanese Unexamined Patent Publication No. 159778/1995 (Tokukaihei 7-159778) (Published Date:Jun. 23, 1995) discloses a reflection-type color display device which is characterized by the provision of a solar cell under a wavelength selective reflecting medium.

However, in the liquid crystal display device disclosed in the above publication (Tokukaihei 7-104250), only the light scattered backwards from the polymer dispersed-type liquid crystal contributes to the white display, and the light scattered forward is all absorbed by the black substrate, and as a result the utilizing efficiency of light is greatly reduced indeed.

In the reflection-type liquid crystal display device disclosed in the above publication (Tokukaihei 10-10528), the transmitted light through the polymer dispersed-type liquid crystal is not completely absorbed in a black display, and the black display obtained is not dark enough and the contrast is reduced.

These problems are solved by the liquid crystal display element disclosed in the above publication (Tokukaihei 9-90352). This arrangement realizes a desirable black display which is dark enough; however, when it comes to a white display, because the tilt angle of the reflecting plate with respect to the horizontal substrate surface is 42° or greater, sufficient brightness cannot be expected unless the scattering efficiency of the liquid crystal layer is superior in order for the incident light to be scattered and to return to the viewer.

That is, in scattering efficiency of a practical liquid crystal layer, scattered light is obtained in the vicinity of light rays transmitting through the liquid crystal layer. However, in the above arrangement, all the light components transmitting through the liquid crystal layer, regardless of the direction of the incident light, are absorbed in the liquid crystal display element and do not emerge from the liquid crystal display element. Thus, most of the scattered light is absorbed in the liquid crystal display element, or even when emerges from the liquid crystal display element, the scattered light does not come back to the viewer. Therefore, sufficient brightness cannot be expected in the above arrangement.

In order to solve this drawback, one can take a measure of, for example, increasing the thickness of the liquid crystal layer. However, this poses another drawback that the driving voltage is increased by the thickness of the liquid crystal layer, and therefore is not practical. There also is an arrangement wherein a reflecting medium is spaced with intervals, yet in this arrangement, the polymer dispersed-type liquid crystal is positioned directly above the light absorbing medium in the intervals of the reflecting medium, and for the same reason as in the above publication (Tokukaihei 7-104250), a white display with sufficient brightness cannot be expected.

Further, in the liquid crystal display device disclosed in the above publication (Tokukaihei 10-20290), because no light absorbing layer is provided, a desirable black display cannot be obtained in a mode with no polarizing plate or dichroic pigment. Furthermore, the above publication does not disclose in detail the limitation of the tilt angle of the reflection plane or the shape of the reflecting plane, other than the disclosure that the reflecting medium is in the form of a pyramid or cone.

Further, in the display element disclosed in the above publication (Tokukaihei 5-134266), in a white display, in order to reflect incident light perpendicular to the display element back to the observer viewing the display device, it is required that the product of the difference in refractive index of the liquid crystal layer and the polymer material layer and the distance of the two layers be narrowed down to the range of a visible light wavelength. Although the above publication does not disclose detailed description of a driving voltage, in general, the driving voltage tends to be high when the distance of the liquid crystal layer and the polymer material layer is narrow, and there is also the problem of high driving voltage. Further, there is also a problem that the reflection wavelength of incident light diagonal to the display element becomes short.

Further, in the reflection-type direct viewing color display device as disclosed in the above publication (Tokukaihei 9-281477), there are required two kinds of holograms for splitting incident light from a certain direction so as to allow the split rays of light to be incident on their respective color filters, which presents the disadvantage in manufacturing accuracy and cost. Also, in using these holograms, the wavelength components which are different from that of the light other than the light incident from a certain direction are reflected, and the color purity of the color filters are reduced.

Further, the color display device as disclosed in the above publication (Tokukaihei 8-320480) does not take into consideration of the incident polar angle of the light reflected by the light reflecting color filter and detailed description thereof is not disclosed. Further, when used as a reflection-type color display device, a color filter will be limited to the combination of, for example, red and cyan which is a complementary color of red, as recited in Examples of the above publication, and therefore this color display device is not suitable for realizing a full-color display.

Meanwhile, in the reflection-type color display device as disclosed in the above publication (Tokukaihei 7-159778), even though it does not include a clear recitation of setting the liquid crystal layer, in order to ensure desirable black display as a color display, as recited in Examples of the above publication, it is required to provide an optical element with good light absorbing characteristic such as a polarizing plate, and the intensity of light incident on the solar cell is reduced indeed.

SUMMARY OF THE INVENTION

The present invention was made to solve the foregoing problems and it is an object of the present invention to provide a reflection-type liquid crystal display device having high brightness in a white display, which is capable of clear multi-color display with a high contrast ratio, and which can be manufactured with high productivity.

The inventors of the present application, after extensive research, have come up with an arrangement in which both white display and black display can be realized desirably without a polarizing plate, using a reflection plane inclined with respect to a display plane of the liquid crystal display device. This arrangement is not just limited to the liquid crystal display device employing polymer dispersed-type liquid crystal, but is equally effective for all types of display devices in which switching is made between a transmissive state and a scattering or reflecting state.

In order to achieve the above object, a reflection-type liquid crystal display device of the present invention includes: a pair of substrates; a liquid crystal layer sandwiched between the pair of substrates; one of the pair of substrates or a substrate adjacent to one of the substrates partially having a reflecting property, and a reflection plane being inclined toward the opposite side of an user of the reflection-type liquid crystal display device, and namely the reflection-type liquid crystal display device is arranged such that an inner product of (a) a regular projection vector of a normal vector of the inclined reflection plane onto a display plane and (b) a regular projection vector of a vector in a direction toward the user of the liquid crystal display device is set to be negative, and a tilt angle made by at least a portion of the reflection plane with respect to a horizontal plane of the pair of substrates is not less than $\theta$ and less than $2\times\theta$ as defined by an equation $$\theta = \tfrac{1}{2} \times \arcsin(n0/n1) \tag{1}$$

where n0 is a refractive index of atmosphere, and n1 is a refractive index of a substance for leveling an inclined plane.

With this arrangement, it is possible to realize a white display with high brightness in a scattering state or reflecting state and with less coloration.

In order to achieve the foregoing object, the reflection-type liquid crystal display device of the present invention includes: a pair of substrates; a liquid crystal layer sandwiched between the pair of substrates; and a reflection plane provided at least partially on one of the pair of substrates or at least partially on a substrate adjacent to one of the pair of substrates, the reflection plane being inclined toward an opposite side of an user, and the reflection-type liquid crystal display device is arranged such that an inner product of (a) a regular projection vector of a normal vector of the reflection plane onto a display plane and (b) a regular projection vector of a vector in a direction from the reflection-type liquid crystal display device toward the user is not more than 0, and a tilt angle made by at least a portion of the reflection plane with respect to a horizontal plane of the pair of substrates is not less than 20° and not more than 30°.

With this arrangement, by setting the tilt angle made by at least a portion of the reflection plane with respect to the substrate horizontal plane within the range of not less than 20° and not more than 30°, it is possible to set an optimum range for a black secure region, i.e., the angle range in which a black display is secured when the liquid crystal layer of the reflection-type liquid crystal display device is in the transmissive state, without using a special material with the refractive index value which is not commonly employed, thus improving both black and white displays.

As a result, by the desirable black and white displays, contrast can be improved, and it is possible to realize a reflection-type liquid crystal display device with high display quality.

In order to achieve the foregoing object, the reflection-type liquid crystal display device of the present invention includes: a substrate including a boundary plane on which external light is incident; a reflection plane for reflecting incident light; and a liquid crystal layer sandwiched between the substrate and the reflection plane, the reflection plane being positioned such that at least a portion of the reflection plane makes an angle of not less than $\theta$ and less than $2\times\theta$ with respect to the substrate, where $\theta$ is an angle made by the reflection plane with respect to the boundary plane when the reflection plane is positioned such that the incident light perpendicularly incident on the boundary plane of the substrate and reflected off the reflection plane is totally reflected at the boundary plane when the liquid crystal layer is in an transmissive state for the incident light.

With this arrangement, the reflection plane is provided at an angle of not less than $\theta$ and less than $2\times\theta$ with respect to the boundary plane, where $\theta$ is an angle made by the reflection plane with respect to the boundary plane when the reflection plane is positioned such that the external light perpendicularly incident on the boundary plane, transmitted through the liquid crystal layer, and reflected off the reflection plane is totally reflected at the boundary plane, and that the external light incident from a certain direction emerges from the present reflection-type liquid crystal display device.

With this arrangement, when the liquid crystal layer is in the light transmissive state, incident external light is reflected by the reflection plane so as to limit the direction in which the light emerges from the device.

Namely, by setting the angle made by the boundary plane and the reflection plane in a range of not less than $\theta$ and less than $2\times\theta$, the light incident on the boundary plane from an arbitrary direction and reflected off the reflection plane emerges toward an inclined direction of the reflection plane (regular projection direction of a normal direction of the reflection plane with respect to the boundary plane), thus preventing the light from emerging toward the opposite side of the inclined direction of the reflection plane.

This is because, by the definition of $\theta$, the light which emerges on the boundary plane from the opposite side of the inclined direction of the reflection plane takes an optical path with a direction of travel opposite to the inclined direction of the reflection plane, from the liquid crystal layer toward the boundary plane to be totally reflected at the boundary plane. However, in the above arrangement, it is less likely that the external light takes such an optical path in the reflection-type liquid crystal display device.

Thus, when the liquid crystal layer is in the transmissive state, when viewing the present reflection-type liquid crystal display device in a perpendicular direction with respect to the boundary plane, no light emerges in this direction, thus obtaining a desirable black display.

Meanwhile, when the liquid crystal layer is in a state of, for example, scattering or reflecting light, the light emerges also in the viewing direction and a white display is obtained. Here, even when the liquid crystal layer is scattering or reflecting light in this manner, it is difficult to make all incident light on the liquid crystal layer to emerge from the boundary plane solely by this scattering or reflecting effect, and some of the light reach the reflection plane.

Thus, there is a need to utilize light which has reached the reflection plane so as to improve brightness in a white display. Here, when the angle made by the reflection plane with respect to the boundary plane is large, the light reflected off the reflection plane concentrates in a direction more towards the parallel direction of the boundary plane on the side of the inclined direction of the reflection plane, and as a result the quantity of the light which directs in the viewing direction in a white display becomes less. Thus, the angle made by the reflection plane with respect to the boundary plane needs to be made smaller. However, in the event where the angle is too small, the light leaks in the viewing direction in a black display and the black display is impaired.

Thus, by setting the angle made by the reflection plane with respect to the boundary plane in accordance with the described arrangement, brightness in a white display can be improved without impairing the black display.

In particular, by making the angle made by the reflection plane with respect to the boundary plane small within the range under the above conditions, i.e., by making the angle to approach $\theta$, the brightness in a white display can be maximized within the range which does not impair the black display, and the quantity of the light which emerges in the viewing direction can be increased, thus obtaining a desirable white display as compared with a conventional reflection-type liquid crystal display device. The upper limit of the angle made by the reflection plane with respect to the boundary plane is set to be less than $2\times\theta$. This is because in the scattering efficiency of a practical liquid crystal layer, scattering light is obtained in the vicinity of light rays transmitting through the liquid crystal layer, and in order to obtain a sufficiently bright white display, it is preferable that the light ray incident on the present reflection-type liquid crystal display device and transmitted through the liquid crystal layer emerges from the present reflection-type liquid crystal display device while not impairing the black display. Thus, it is required that the angle made by the reflection plane with respect to the boundary plane is smaller than $2\times\theta$ as defined by the equation (1).

With the described arrangement, when the liquid crystal layer is in the light transmissive state, the light is prevented from emerging in the viewing direction, and when the liquid crystal layer is in the light scattering or reflecting state, more light emerges in the viewing direction, and as a result the brightness in a white display can be maximized without impairing the black display, thereby improving both black and white displays.

As a result, by the desirable black and white displays, contrast can be improved, and it is possible to provide a reflection-type liquid crystal display device with high display quality.

In order to achieve the foregoing object, the reflection-type liquid crystal display device of the present invention includes: a substrate including a boundary plane which is a boundary from an external layer; a liquid crystal layer being parallel to the boundary plane; a transparent film being positioned to face the substrate via the liquid crystal layer and to be parallel to the boundary plane of the substrate; and a reflection plane buried in the transparent film, the reflection plane being positioned such that at least a portion of the reflection plane makes an angle of not less than $\theta$ and less than $2\times\theta$ with respect to the boundary plane, $\theta$ being defined to satisfy an equation $$\theta = \frac{1}{2} \times \arcsin(n0/n1)$$

where n0 is a refractive index of the external layer and n1 is a refractive index of the transparent film.

With this arrangement, there are provided the liquid crystal layer and transparent film both parallel to the boundary plane, and the reflection plane is buried in the transparent film. At least a portion of the reflection plane is provided to make an angle of not less than $\theta$ and less than $2\times\theta$ with respect to the boundary plane (where $\theta$ is defined to satisfy the equation (1)).

With this arrangement, when the liquid crystal layer is in the light transmissive state, the light incident from a direction inclined toward the inclined direction of the reflection plane with respect to the normal direction of the boundary plane emerges toward the inclined direction of the reflection plane when emerging from the boundary plane. On the other hand, the light incident from a direction inclined toward the opposite side of the inclined direction of the reflection plane with respect to the normal direction of the boundary plane and reflected by the reflection plane is totally reflected at the boundary plane and does not emerge from the boundary plane.

Thus, when the liquid crystal layer is in a state for accepting a rectilinear propagation of light, the light does not emerge toward the side opposite to the inclined direction of the reflection plane. Thus, as with the reflection-type liquid crystal display device having the described arrangements, when viewing the present reflection-type liquid crystal display device from a direction perpendicular to the boundary plane, no light emerges in the viewing direction, and a desirable black display can be obtained.

On the other hand, when the liquid crystal layer is in a state, for example, for scattering or reflecting light, as with the reflection-type liquid crystal display device having the described arrangements, a white display can be obtained, and by making the angle made by the reflection plane with respect to the boundary plane to approach $\theta$, a desirable white display can be obtained. Further, the upper limit of the angle made by the reflection plane with respect to the boundary plane is set to be less than $2\times\theta$. This is because in the scattering efficiency of a practical liquid crystal layer, scattering light is obtained in the vicinity of light rays transmitting through the liquid crystal layer, and in order to obtain a sufficiently bright white display, it is preferable that the light ray incident on the present reflection-type liquid crystal display device and transmitted through the liquid crystal layer emerges from the present reflection-type liquid crystal display device while not impairing the black display. Thus, it is required that the angle made by the reflection plane with respect to the boundary plane is smaller than $2\times\theta$ as defined by the equation (1).

As a result, by the desirable black and white displays, contrast can be improved, and it is possible to provide a reflection-type liquid crystal display device with high display quality.

In order to achieve the foregoing object, the reflection-type liquid crystal display device of the present invention includes: a display plane on which light is incident; a reflection plane for reflecting incident light, the reflection plane being positioned so as to face the display plane; and a liquid crystal layer provided between the display plane and the reflection plane, the reflection plane being inclined with respect to the display plane, and the reflection plane being rotatable within a plane parallel to the display plane.

With this arrangement, the reflection plane for reflecting light incident on the display plane is provided by being inclined with respect to the display plane, and the reflection plane is made rotatable within the plane parallel to the display plane.

Thus, when using the present reflection-type liquid crystal display device, the direction of the reflection plane can be adjusted in accordance with the direction of external light, making it possible to reflect external light to satisfy the condition which is suitable for the reflection plane to carry out display. As a result, in the present reflection-type liquid crystal display device, an optimum display can be obtained in accordance with the conditions in which the device is used.

For a fuller understanding of the nature and advantages of the invention, reference should be made to the ensuing detailed description taken in conjunction with the accompanying drawings.

BRIEF DESCRIPTION OF THE DRAWINGS

FIG. 9 is a graph showing incident angle direction dependence of a luminance factor in a white display of the reflection-type liquid crystal display device in accordance with the First Embodiment.

FIG. 10(a) is a plan view of another reflection plane and light absorbing layer of the reflection-type liquid crystal display device in accordance with the First Embodiment, and FIG. 10(b) is a cross section of FIG. 10(a) taken along the line B—B.

DESCRIPTION OF THE EMBODIMENTS

[First Embodiment]

The following will describe one embodiment of the present invention referring to attached drawings.

Figure 1:
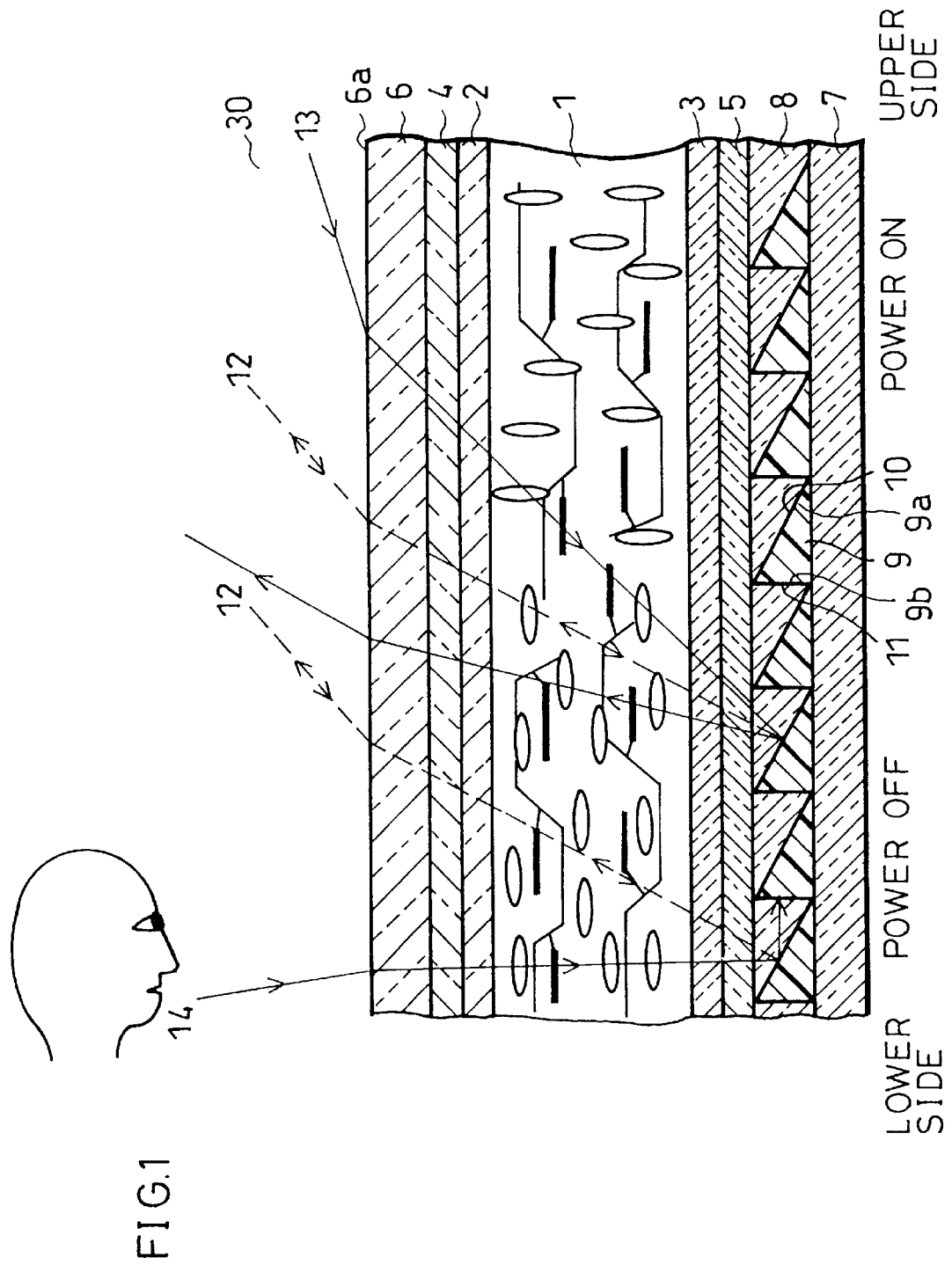
FIG. 1 is a cross sectional view showing a structure of a reflection-type liquid crystal display device in accordance with First Embodiment of the present invention.

FIG. 1 is a cross sectional view of a structure of a light scattering reflection-type liquid crystal display device (mainly liquid crystal panel portion) in accordance with one embodiment of the present invention. A liquid crystal layer 1 is sandwiched between an incident-side substrate (substrate) 6 made of an optically isotropic material such as a transparent glass plate or polymer film and an opposing reflection-side substrate (substrate) 7 made of the same material as that of the substrate 6. On the reflection-side substrate 7 are provided objects 9 on which is formed an inclined plane 9a inclined with respect to the substrates 6 and 7, and a portion of the inclined plane constitutes a reflection plane (reflecting plate, reflecting film, inclined plane with reflecting film) 10. Further, the inclined plane 9a is leveled by a transparent leveling film (leveling film layer, transparent film, light transmissive medium, high refractive index medium) 8 having a refractive index of, for example, 1.5. The present embodiment adopts the leveling film 8, yet the present invention is not limited to the embodiment employing the leveling film 8.

However, by the process of leveling using the leveling film 8, the alignment of the liquid crystal of the liquid crystal layer 1 can be improved.

Here, the incident-side substrate 6 is a parallel plate constituting a boundary plane (substrate horizontal plane, display plane) 6a which is a boundary between an air layer (external layer) 30 and the liquid crystal panel, and through which incident light (external light) is incident on the liquid crystal panel. The liquid crystal layer 1, by being placed between the incident-side substrate 6 and the reflection-side substrate 7, constitutes a parallel layer with respect to the boundary plane 6a. The leveling film 8 is formed such that its plane on the side of the liquid crystal layer 1 is parallel to the boundary plane 6a.

Note that, it is not required that all interfaces of the layers are parallel to the boundary plane 6a. When the leveling film 8 is not provided, an element (for example, liquid crystal layer 1) for leveling the reflection plane 10 is provided.

The substrates 6 and 7 are provided with electrodes 4 and 5, respectively, for applying a voltage to the liquid crystal layer 1. As voltage applying means for the pair of electrodes, an active element may be used, and obviously the present invention is not limited by such voltage applying means. The electrodes 4 and 5 are coated with horizontal alignment films 2 and 3, respectively, so that the liquid crystal layer 1 is aligned in the horizontal direction under no applied voltage. The present embodiment uses the horizontal alignment films 2 and 3 but the type of alignment films is not limited.

The object 9 having the inclined plane 9a, formed on the reflection-side substrate 7, is manufactured by printing an acrylic resin film by pressing, followed by curing while the film is being pressed against a mold which has been processed with a ultra precision process by ion beam etching. In this manner, the object 9 is manufactured such that the height of the inclined plane 9a from the surface of the reflection-side substrate 7 is 5 μm, the angle made by the right side plane (inclined plane 9a) in FIG. 1 and the reflection-side substrate 7 is 30°, and the left side plane (perpendicular plane 9b, a portion without reflection plane) is substantially perpendicular to the reflection-side substrate 7 (i.e., substantially perpendicular to the boundary plane 6a). Also, after a light absorbing layer (light absorbing layer, light absorbing plane) 11 is applied on the reflection-side substrate 7, aluminium was vapor-deposited in the thickness of 200 nm from a right upward direction (60° angle from the horizontal direction, normal direction to the inclined plane 9a) so as to apply an aluminium reflection film only to the inclined plane 9a on the right side.

Note that, the light absorbing layer 11 was formed as follows. By applying a resin black on the reflection-side substrate 7 having the inclined plane 9a, followed by baking at 180° C. Here, as the resin black, for example, the FUJIFILM Olin Co., Ltd. product, CK2000 (Registered Trade Mark in Japan) was used.

As the liquid crystal layer 1, a polymer dispersed-type liquid crystal was used, and the liquid crystal layer 1 was prepared by placing and dissolving a mixture of a low molecular weight liquid crystal composite and unpolymerized pre-polymer between the substrates 6 and 7 and by polymerizing the pre-polymer thereafter. In the present embodiment, as the polymer dispersed-type liquid crystal, a curable substance (UV curable liquid crystal), which can be obtained by curing a mixture of a liquid crystalline UV curable pre-polymer and a liquid crystal composite by irradiation of active light such as UV light is used. The use of UV curable resin as the polymer dispersed-type liquid crystal eliminates the need for heating in polymerizing the polymerizable liquid crystal, thus preventing the adverse effect of heating on other components.

The pre-polymer liquid crystal mixture can employ, for example, a product which is obtained by adding a small amount of a polymerization initiator (provided by Ciba-Geigy Corporation) to a mixture in a weight ratio of 20:80 of a UV curable material (provided by Dainippon Ink and Chemicals, Inc.:Product Name "Mixture=C") and a liquid crystal (provided by Merck & Co., Inc.:Product Name "MS93392" (Registered Trade Mark in Japan, Δn=0.124)). The pre-polymer liquid crystal mixture produced in this manner shows a nematic liquid crystal phase at ordinary temperature.

In the following are defined some of the terms used herein. A vector which results from a regular projection of a normal vector of the reflection plane 10 onto the boundary plane 6a will be defined as an inclined direction of the reflection plane 10, and the side in which this inclined direction is directed will be defined as the upper side of the liquid crystal panel, and the direction opposite to this upper side will be defined as the lower side. Also, the incident angle, reflection angle, and refraction angle of the light are defined as the angles made by the rays of incident light, reflected light, and refracted light with respect to normal to the interface of each layer material. Further, the present reflection-type liquid crystal display device is to be viewed by a viewer mainly from a direction normal to the incident-side substrate 6, which direction will de defined as a viewing direction (viewing azimuth).

The following will describe optical effects under applied voltage and under no applied voltage in the reflection-type liquid crystal display device of the present embodiment referring to FIG. 1. The incident light on the liquid crystal layer 1 reaches the reflection plane 10 in accordance with a scattering or transmissive state of the liquid crystal layer 1 which has been aligned in response to an applied voltage. In the present embodiment, the liquid crystal layer 1 is set to be in the transmissive state under no applied voltage, and in the scattering state under applied voltage.

First, an operation of a white display (bright display, white state, bright state) will be described. When the power is turned ON (under applied voltage), incident light is incident on the liquid crystal layer 1, and the rectilinear light and forward-scattered light, having transmitted through the liquid crystal layer 1, are reflected off the reflection plane 10, and are subjected to the scattering effect as they transmit again through the liquid crystal layer 1 which is in the transmissive state, and as a result a large quantity of light, not just light which has been scattered backward, returns in the viewing direction. Here, in addition to the back-scattered light which is inefficient, by utilizing the rectilinear light and forward-scattered light which transmit through the liquid crystal layer 1, a display with significantly high brightness can be obtained.

Further, considering a driving voltage, the actual thickness of the liquid crystal layer 1 needs to be designed so that it is sufficiently thin, and for this reason the scattering efficiency of the liquid crystal layer 1 cannot be all regarded as perfect diffusion. Thus, most of the incident light takes the form of either the rectilinear light transmitting through the liquid crystal layer 1, or scattering light in the vicinity of the rectilinear light even when scattered. Therefore, in order to realize a white display with even higher brightness, it is important that the reflection plane 10 be positioned as parallel as possible to the incident-side substrate 7 within the range which does not ruin the black display.

The following describes an operation of a black display (dark display, black state, dark state). In the following is considered a case where, when the power is turned OFF (under no applied voltage), light is incident on the liquid crystal layer 1 in the transmissive state for example along the solid line 13 on the side (upper side of the liquid crystal panel) further from the broken line 12 (incident light in a normal direction of the reflection plane 10) with respect to the viewer. The incident light is subjected to the effect of refraction upon incident on the incident-side substrate 6 from the air layer 30, and transmits through the liquid crystal layer 1 and the leveling film 8, and is further subjected to the effect of refraction by a difference in refractive index of each layer, and reaches the reflection plane 10. The light is then regularly reflected off the reflection plane 10, and, as above, transmits through the leveling film 8 and the liquid crystal layer 1, and emerges from the incident-side substrate 6 to the air layer 30 by being subjected to the effect of refraction (solid line 13). FIG. 1 is drawn such that the incident light along the broken line 12 leaves along the broken line 12.

Here, by setting the tilt angle of the reflection plane 10 (angle made by reflection plane 10 with respect to boundary plane 6a) larger than θ (but less than 2×θ) as determined by the following Equation (1), $$\theta = \tfrac{1}{2} \times \arcsin(n0/n1) \quad (1)$$

the emergent light leaves in a direction (upper side of liquid crystal panel) further away from the viewer with respect to the normal to the substrate, and the emergent light does not fall in the viewer's eye.

Further, the upper limit of the angle made by the reflection plane 10 and the boundary plane 6a is preferably less than 2×θ. Considering the scatting efficiency of practical liquid crystal layer 1, because the scattering light is obtained in the vicinity of the light transmitting through the liquid crystal layer 1, in order to obtain a white display with sufficient brightness, it is preferable that the above angle is set to satisfy a condition that the light incident on the present reflection-type liquid crystal display device, having transmitted through the liquid crystal layer 1 emerges from the present reflection-type liquid crystal display device without losing a black display. To realize this, the angle made by the reflection plane with respect to the boundary plane is required to be less than 2×θ as defined by Equation (1).

Here, the tilt angle θ of the reflection plane 10 (value which satisfies Equation (1)) is determined so that the incident light when assuming the presence of horizontally incident light on the incident-side substrate 6 from the upper side of the panel emerges from the panel in a direction perpendicular to the substrate. Note that, n0 is the refractive index of atmosphere (air layer 30), and ni is the refractive index of an element for leveling the inclined plane 9a (here, leveling film 8).

That is, when interfaces of the layers from the air layer 30 through the leveling film 8 are all parallel to one another or parallel to one another except one interface, the relationship between an incident angle of the incident light on the incident-side substrate 6 from the air layer 30 and the angle made by the propagation direction of the incident light through the leveling film 8 with respect to the boundary plane 6a is determined by n0 and n1. The angle θ satisfying the Equation (1) gives rise to the condition of the optical path where the light perpendicularly incident on the boundary plane 6a and regularly reflected off the reflection plane 10 while the liquid crystal layer 1 is in the transmissive state is incident on the boundary plane 6a from the side of the liquid crystal layer 1 at a critical angle.

The following considers the case where light is incident on the liquid crystal layer 1 in the transmissive state from a side (lower side of the liquid crystal panel), for example, along the solid line 14 closer to the viewer than the broken line 12. Here, the incident light is subjected to the effect of refraction upon incident on the incident-side substrate 6 from the air layer 30 in the same manner as above, and transmits through the liquid crystal layer 1 and the leveling film 8, and the light is directly incident and absorbed on the light absorbing layer 11 formed on the perpendicular plane 9b. This depends on the incident angle of the incident light, and so depending on the incident angle, while some are incident and absorbed directly on the light absorbing layer 11 as described above, others take the optical path in the reverse direction of the arrow on the solid line 13 to emerge further away from the viewer (to the upper side of the liquid crystal panel).

Still, others are totally reflected between the incident-side substrate 6 and the air layer 30, and after being reflected repeatedly between the reflection plane 10 on the inclined plane 9a and the incident-side substrate 6, they are either absorbed by the light absorbing layer 11, or emerge away from the viewer (to the upper side of the liquid crystal panel) along the broken line 12 with respect to the incident-side substrate 6. In either case, the emergent light will not fall in the viewer's eye.

Note that, in FIG. 1, the state of refraction of incident light on the incident-side substrate 6 from the air layer 30 is indicated by a kinked line, and the state of refraction at the other layer interfaces is simplified and indicated by a straight line. In the following, the state of refraction will also be indicated by a simple straight line as required.

The foregoing described the case where the present liquid crystal panel is observed from the viewing direction as defined above. However, the present liquid crystal panel will not be limited by this in actual use. In particular, for the reasons as described above, a desirable black display can be observed when viewed in a direction inclined towards the lower side of the liquid crystal panel. In this manner, when the viewing direction is in the direction of the viewer in particular, the following conditions are met. That is, the inner product of a regular projection vector onto the boundary plane 6a in the direction of the user and a regular projection vector onto the boundary plane 6a in a normal direction of the reflection plane 10 is not more than 0.

Further, even though the foregoing described the arrangement where the reflection plane 10 is fixed to the liquid crystal panel, it is possible alternatively to have an arrangement where the reflection plane 10 is rotatable with respect to the incident-side substrate 6, together with the reflection-side substrate 7. When using the present reflection-type liquid crystal display device in this arrangement, a further desirable white display can be obtained by adjusting the inclined direction of the reflection plane 10 in accordance with the positional relationship between the azimuth of incident light and the liquid crystal panel (refer to Example 4 below).

Figure 2A:
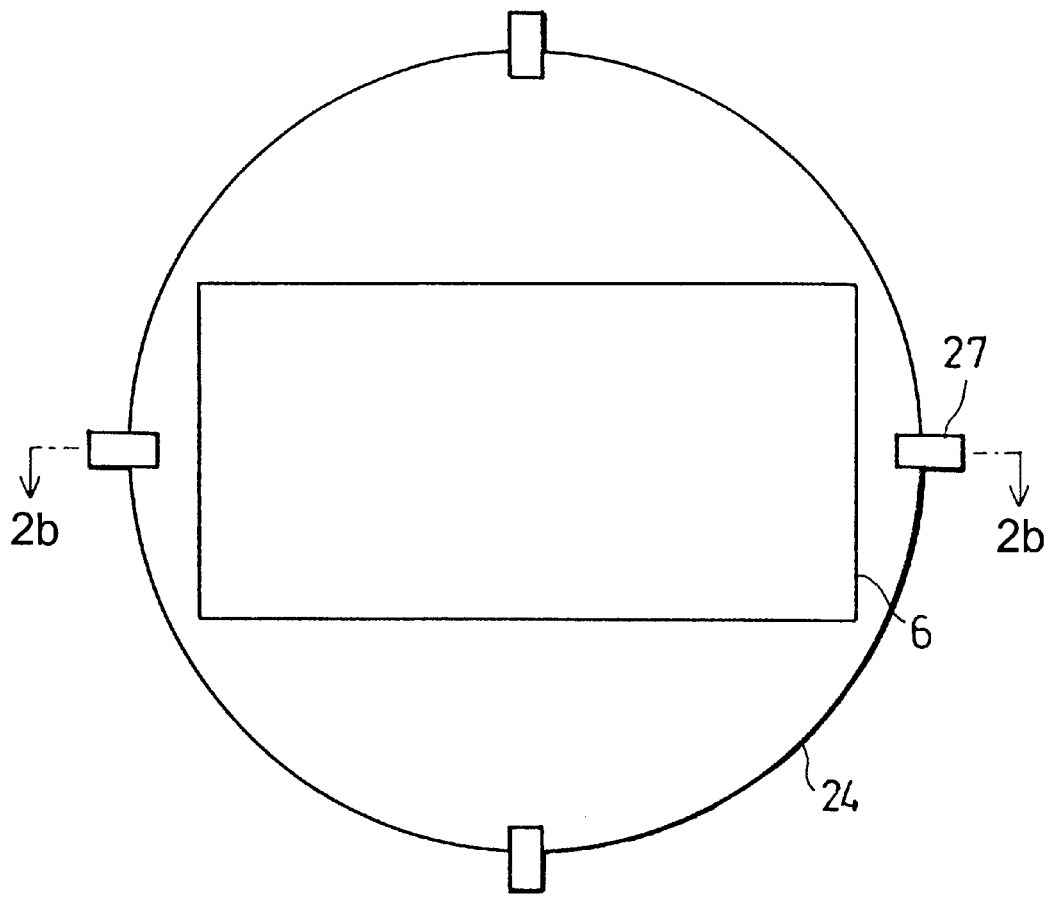
FIG. 2(a) is a plan view of the reflection-type liquid crystal display device of the First Embodiment with a rotatable inclined direction of the reflection plane.
Figure 2B:
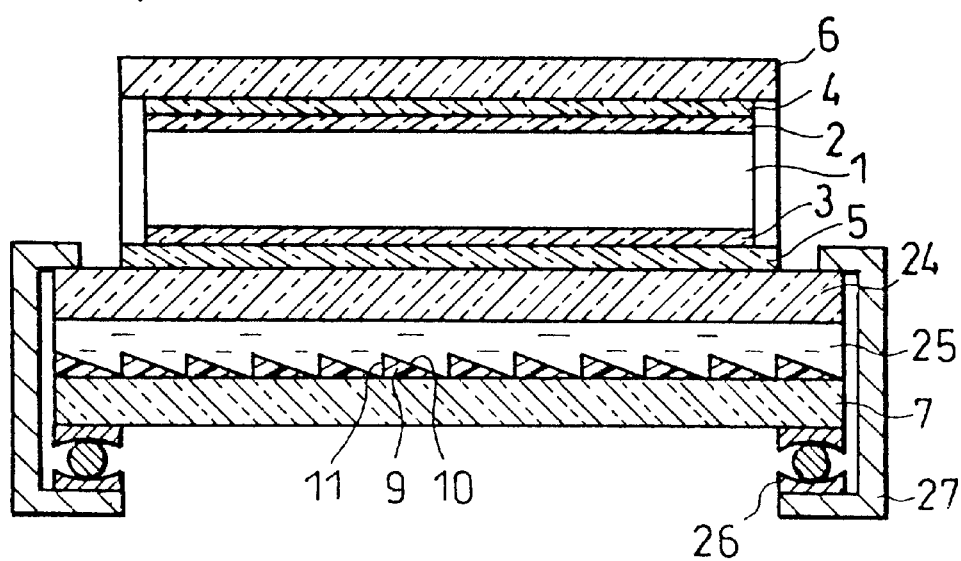
FIG. 2(b) is a cross section of FIG. 2(a) taken along the line A—A.

The following will describe one example of a rotary mechanism of the reflection plane 10 based on FIG. 2(a) and FIG. 2(b). FIG. 2(a) is a plan view of a reflection-type liquid crystal display device having a rotary mechanism of the reflection plane 10; and FIG. 2(b) is a cross sectional view of FIG. 2(a) taken along the line A—A. Note that, in FIG. 2(a) and FIG. 2(b), a driving device and other components of the reflection-type liquid crystal display device are omitted.

In this reflection-type liquid crystal display device, there is provided a substrate 24 on which electrodes 5 and a horizontal alignment film 3 are provided. There is also provided a matching oil layer 25 between the substrate 24 and the reflection-side substrate (externally providable element) 7 provided with the object 9 having the reflection plane 10 and light absorbing layer 11. The substrate 24 and the reflection-side substrate 7 are fixed by a clamp 27 via a bearing mechanism 26 provided for example on the reflection-side substrate 7. As a result, the reflection plane 10 can be made rotatable with respect to the incident-side substrate 6, together with the reflection-side substrate 7, making the inclined direction of the reflection plane 10 adjustable.

Further, by realizing the reflection plane 10 by a micromechanical mechanism such as a digital mirror device (DMD), it is possible to realize a mechanism in which the direction of the reflection plane 10 can be changed per pixel unit.

Meanwhile, it is preferable that a positioning pitch of the reflection plane 10 satisfies the following conditions. Namely, in actual image display, the liquid crystal layer 1 is divided by the electrodes 4 and 5, etc., into pixels, each of which constitutes a display area of the smallest unit, and the pitch of the reflection plane 10 is then set to be smaller than this pixel pitch.

When the above conditions are met, even when there is a defect in the reflection plane 10 in the manufacturing process, which adverse effect on a display can be reduced. For example, aluminium vapor-deposited on the apex portion of the reflection plane 10 in forming the reflection plane 10 can cause scattering of light. Further, a dent on the reflection plane 10 is often not vapor-deposited, and this portion appears black in a white display. However, by satisfying the above conditions, the spatial frequency of the reflection plane 10 can be increased, and one cannot recognize the shape of the reflection plane 10 in visual inspection, and a desirable display quality can be obtained even in the presence of the manufacturing defect such as above.

As described, the described arrangement utilizes the optical effects of transmissive and scattering states of the liquid crystal, thus having a feature of smaller influence of wavelength dependence as compared with the mode utilizing the birefringence effect of the liquid crystal.

With this arrangement of the present reflection-type liquid crystal display device, a white display with high brightness and uniform colors, and a desirable black display can be obtained.

EXAMPLE 1

Figure 3:
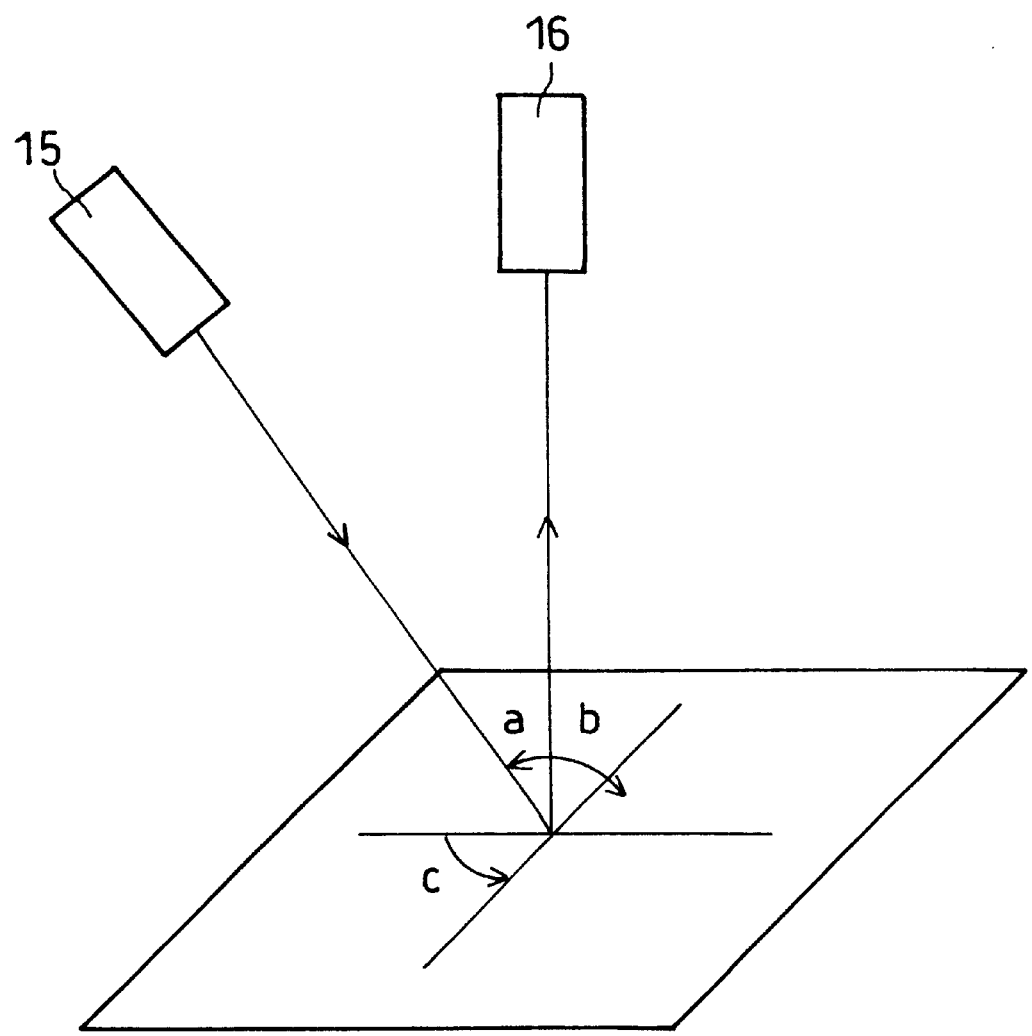
FIG. 3 is a drawing showing an arrangement of a reflection luminance factor measuring device used in Embodiments of the present invention.

As Example 1, the polar angle dependence of projection axis on reflection luminance factor was measured in the liquid crystal display device as shown in FIG. 1 which was manufactured under the conditions given above, using a measuring system equipped with a projector 15 and a photo-receptor 16, etc., as shown in FIG. 3.

The projector 15 is provided such that incident angle (angle of incident light from the projector 15) "a" can be changed in a plane perpendicular to the reflection-type liquid crystal display device. The photo-receptor 16 is provided such that reception angle (angle of polar direction of the photo-receptor 16) "b" can be changed in the plane in which the incident angle "a" of the projector 15 can be changed. The reflection-type liquid crystal display device is placed on a measurement table (not shown) and is rotatable along the direction of azimuthal angle "c".

Here, the optical axes of the projector 15 and photo-receptor 16 coincide on the boundary plane 6a (see FIG. 1) of the reflection-type liquid crystal display device (the point of coincidence will be referred to as an incident point hereinafter).

The incident angle "a" and reception angle "b" are defined such that when they are 90°, the direction from the projector 15 toward the incident point and the direction from the incident point toward the photo-receptor 16 coincide, and the direction normal to the boundary plane 6a (direction from the incident-side substrate 6 toward air layer 30) is defined by the angles of incident angle "a" and reception angle "b" at 0°. Thus, the positive directions of incident angle "a" and reception angle "b" are opposite to each other.

The directions of incident angle "a" and reception angle "b" will be defined as a polar angle direction. The azimuthal angle "c" is defined as the angle within the boundary plane 6a in the counterclockwise direction with respect to the boundary plane 6a round the incident point as the center.

Figure 4:
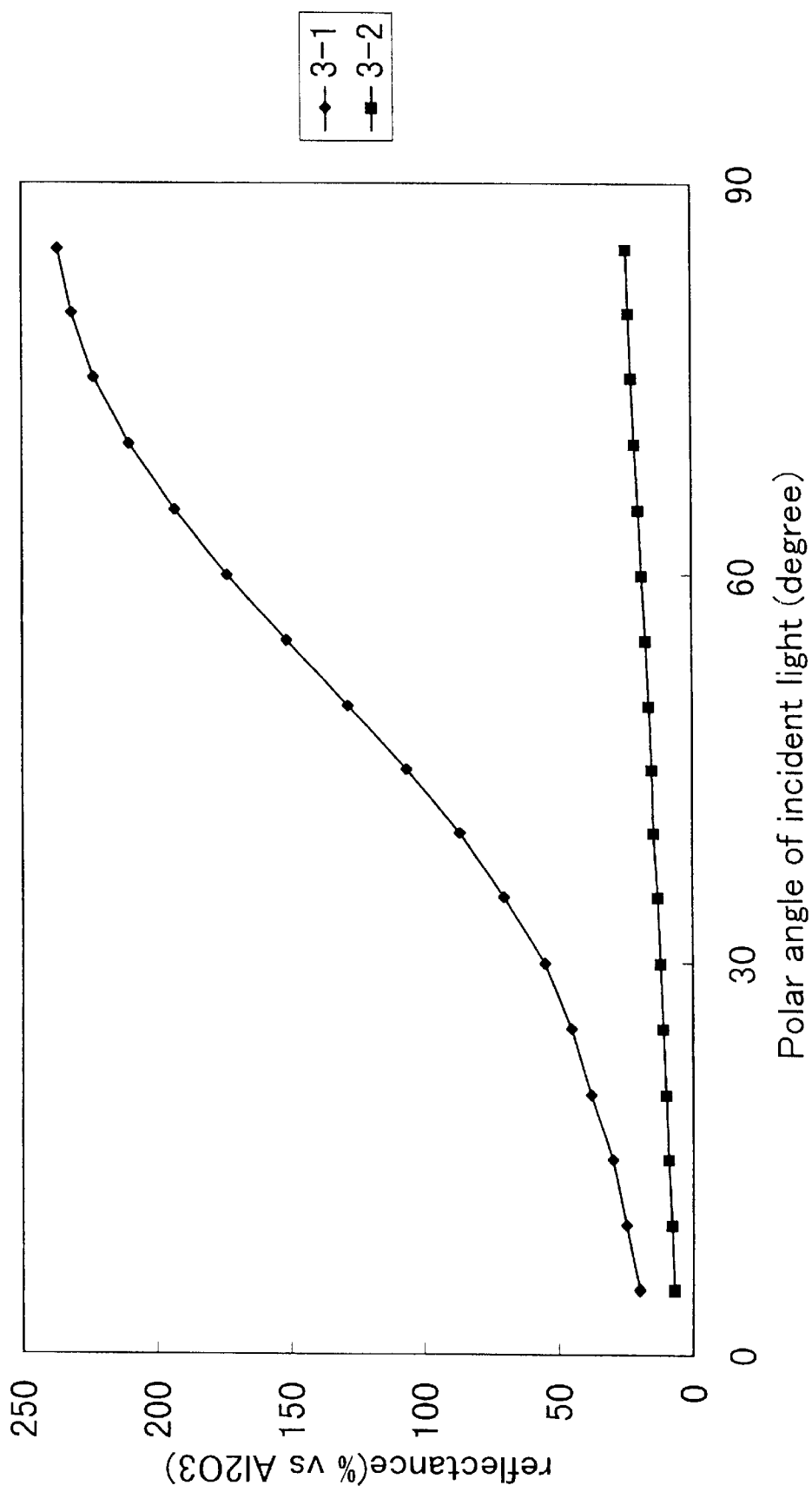
FIG. 4 is a graph showing a relationship between reflection luminance factor and projection angle in a white display of the reflection-type liquid crystal display device in accordance with the First Embodiment.
Figure 5B:
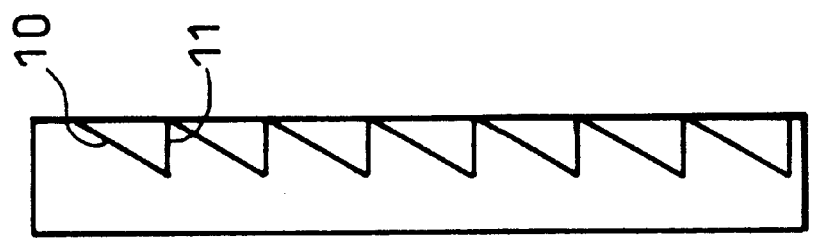
FIG. 5(b) is a side view of FIG. 5(a).
Figure 5A:
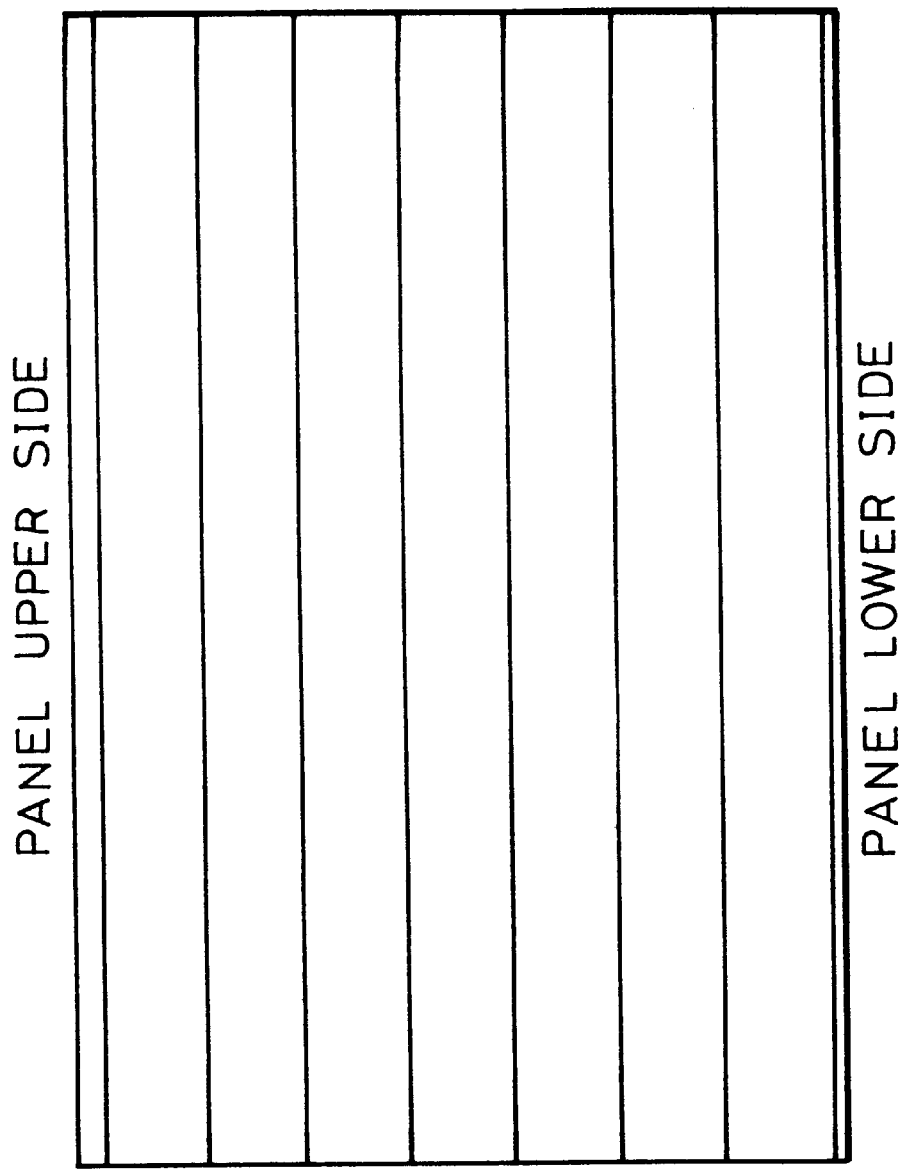
FIG. 5(a) is a plan view of a reflection plane and light absorbing layer of the liquid crystal display device in accordance with the First Embodiment.

First, FIG. 4 shows the results of measurement on reflection gain (relative reflection luminance factor when a reflection luminance factor of a standard white plate (perfect diffusion reflection plate) made of alumina is 100%) characteristics in the incident angle direction of the reflection-type liquid crystal display device, which was measured by varying the incident angle "a" from 5° to 85° at the 5° intervals within the plane made by a normal to the inclined reflection plane 10 (see FIG. 1) and a normal to the reflection-side substrate 7 while fixing the reception angle "b" at 0°. The measurement results of FIG. 4 show the case where the tilt angles of the reflection plane 10 was 30° (curve 3-1) and 45° (curve 3-2), and the shape of the reflection plane 10 was as shown in FIG. 5(a) and FIG. 5(b). Here, the measurement was made while applying a voltage to the reflection-type liquid crystal display device.

Note that, the shape of the reflection plane 10 as shown in FIG. 5(a) and FIG. 5(b) is the same as that of FIG. 1 in cross section, and the light absorbing layer 11 which is substantially perpendicular to the reflection-side substrate 7 and the reflection plane 10 with the above tilt angles with respect to the reflection-side substrate 7 are periodically arranged. The smallest unit of this periodic shape is the triangular prism with the cross section in the form of a right triangle made by the reflection-side substrate 7, light absorbing layer 11, and the reflection plane 10.

From the results of measurement, the average value of data obtained was calculated under the assumed condition in which surrounding light is incident isotropically on the reflection-type liquid crystal display device in actual use. The results showed that the tilt angle of 30° gave the reflectance of 120%, and the tilt angle of 45° gave the reflectance of 15%, and as the tilt angle was varied (more specifically, reduced), the reflection luminance factor improved significantly.

In the present Example, the leveling film 8 with the refractive index of 1.5 is positioned directly on the reflection plane 10, and the Equation (1) gives the minimum tilt angle of the reflection plane 10 of 21°, which is the minimum acceptable angle to maintain a desirable black display. In the present Example, tilt angles of 30° and 45° were used; however, by reducing the tilt angle of the reflection plane 10 as small as 21°, the reflection luminance factor can be expected to increase.

Further, by increasing the refractive index of the leveling film 8 to be placed directly on the reflection plane 10, the minimum value of an acceptable tilt angle to maintain a desirable black display can be further reduced, and further improvement in brightness can be expected. For example, when a leveling film 8 with the refractive index of 1.66 is used, the tilt angle can be reduced to as small as 18.5°.

Note that, for values of refractive index of the leveling film 8 at 1.5 and 1.66, by setting the upper limits of the tilt angle of the reflection plane 10 to be less than 42° and less than 37° (equivalent of 2×θ), respectively, an improvement effect of reflection luminance factor can be obtained.

In the prior art technique disclosed in Japanese Unexamined Patent Publication No. 90352/1997 (Tokukaihei 9-90352), the tilt angle of the reflection plane 10 with respect to the boundary plane 6a is set at 42° or greater. In the present embodiment, by specifying the lower limit of the tilt angle by Equation (1), the brightness in a white display can be significantly improved while maintaining a desirable black display.

EXAMPLE 2

The following describes the performance of a black display. As described, a black display depends on the tilt angle of the reflection plane 10 and the refractive index n1 of the leveling film 8 (see Equation (1)). Thus, a change in reflection luminance factor with respect to a polar angle direction was measured on the liquid crystal panel of FIG. 1 at the refractive indices n1 of 1.5, 1.8, and 2.2, and tilt angles of 24°, 20°, 16°, 13° (n1=2.2), 12° (n1=1.5 and 1.8) (see Example 1 for the measuring method).

Figure 6:
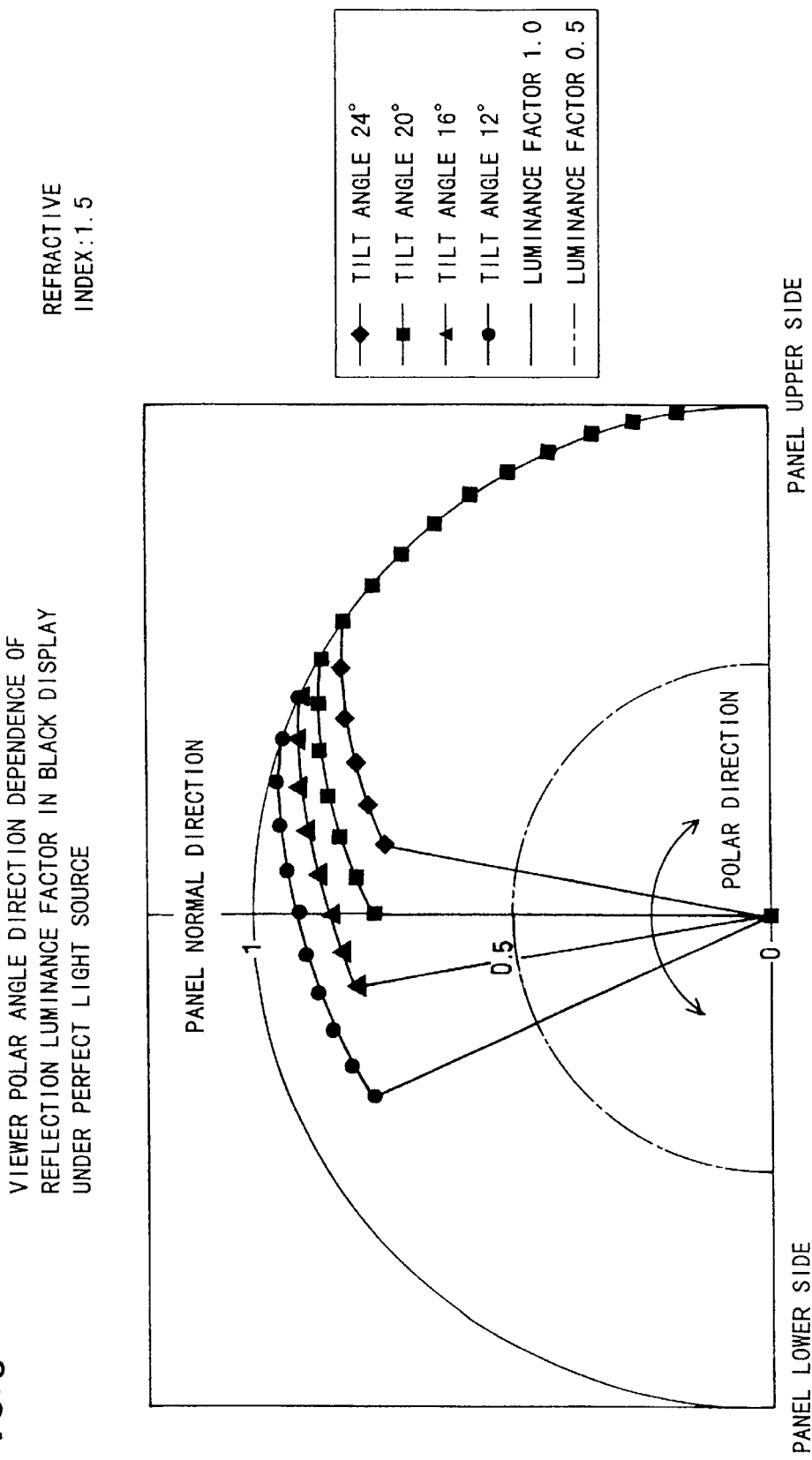
FIG. 6 is a graph showing polar angle dependence of reflection luminance factor in a black display of the reflection-type liquid crystal display device in accordance with the First Embodiment.
Figure 7:
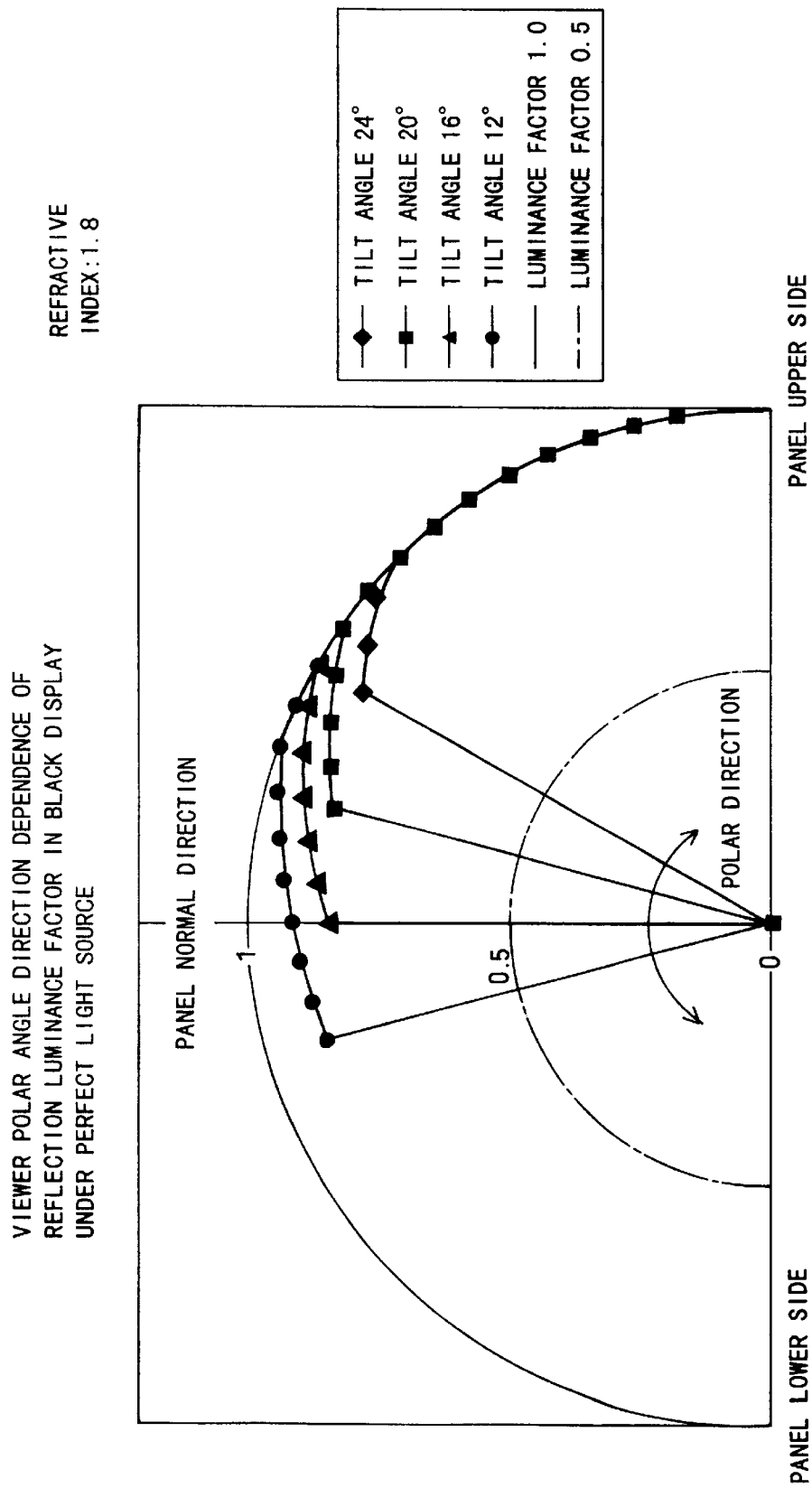
FIG. 7 is a graph showing polar angle dependence of reflection luminance factor in a black display of the reflection-type liquid crystal display device in accordance with the First Embodiment.
Figure 8:
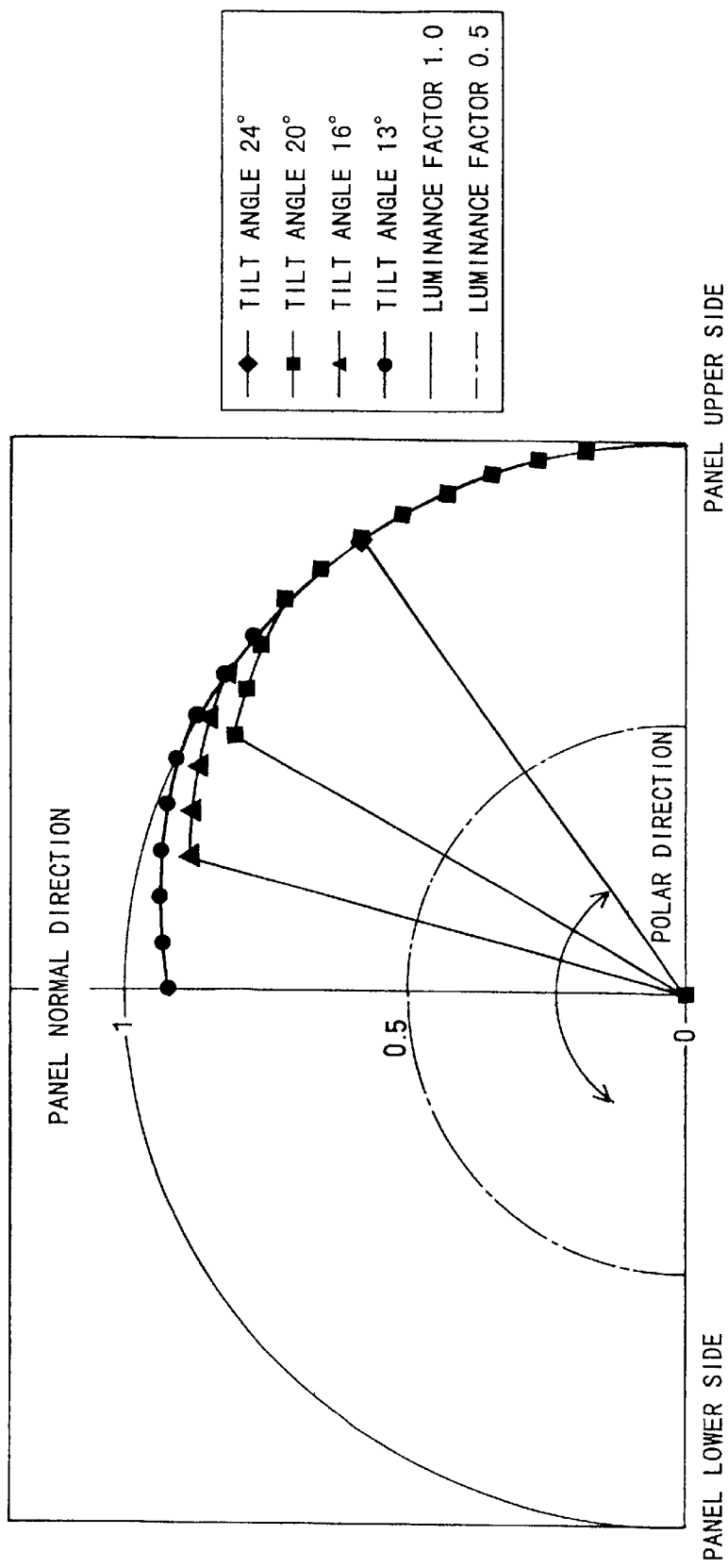
FIG. 8 is a graph showing polar angle dependence of reflection luminance factor in a black display of the reflection-type liquid crystal display device in accordance with the First Embodiment.

The results are shown in FIG. 6 to FIG. 8. FIG. 6 to FIG. 8 are graphs which show a change in reflection luminance factor with respect to a polar angle direction in a black display at a given refractive index and tilt angle. Note that, in FIG. 6 to FIG. 8, the reflection luminance factor is indicated in a relative value (ratio) when the maximum value of reflection luminance factor at each refractive index n1 and tilt angle is 1. Also, FIG. 6 to FIG. 8 correspond to refractive indices n1 of 1.5, 1.8, and 2.2, respectively.

It can be seen from FIG. 6 to FIG. 8 that at n1=1.5, 1.8, and 2.2, the tilt angle which gives the region with the reflection luminance factor of 0 within the range of the polar angle direction to the right (upper side of the liquid crystal panel) of the normal direction of the liquid crystal panel is 20°, 16°, and 13°, or above, respectively.

Also, the values of θ given by Equation 1 at n1=1.5, 1.8, and 2.2 are 21°, 17°, and 14°, respectively. A comparison of these values with the respective Figures makes it clear that a desirable black display can be obtained when the tilt angle of the reflection plane 10 is set at a value as given by the angle θ when the viewer observes the liquid crystal panel from the normal direction.

Further, as described in Example 1, a bright white display can be obtained by reducing the tilt angle of the reflection plane 10. Thus, it is preferable that the leveling film (high refractive index medium) 8 is made of a material with the refractive index n1 of greater than 1 and as high as possible provided that it is colorless and transparent (e.g. n1=3 when made of $TiO_2$). Namely, the leveling film 8 is preferably a refracting medium having transparency with the refractive index of greater than 1 and not more than 3.

As described, by setting the tilt angle of the reflection plane 10 taking into account the value obtained from Equation 1, a white display with further brightness can be obtained while maintaining a desirable black display, thus realizing a reflection-type liquid crystal display device with a superior image quality.

EXAMPLE 3

Figure 18:
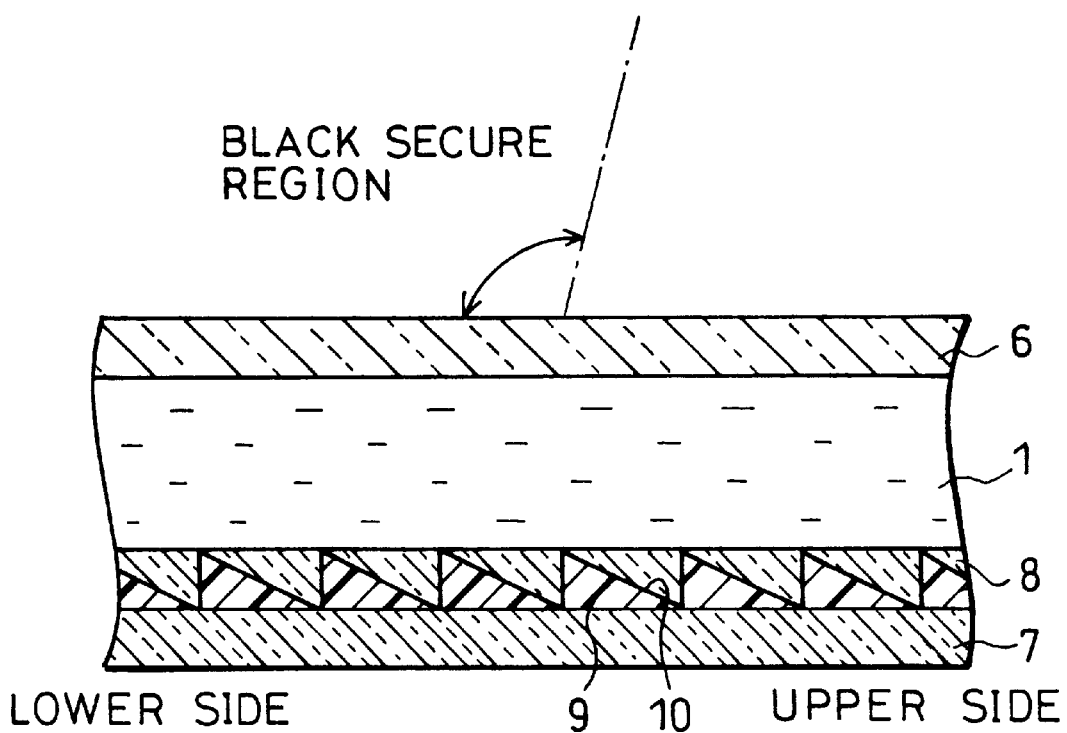
FIG. 18 is a concept drawing showing a black secure region.

In the following, a further preferable value of the tilt angle of the reflection plane 10 was obtained taking into consideration the reflection-type liquid crystal display device in actual use. Here, a consideration was given to a black secure region. First, the black secure region will be described referring to FIG. 18. FIG. 18 is a concept view showing the black secure region. Note that, the liquid crystal panel of FIG. 18 is a simplified version of FIG. 1.

The black secure region is the angle range in which a black display is ensured in the liquid crystal panel when the liquid crystal layer 1 is in the transmissive state, i.e., in the state of a black display. Note that, the angle range is defined by an angle with respect to the lower side of the liquid crystal panel.

The black secure region is required to be set as small as possible within the range which does not create the problem of too small of a viewing angle range (viewing angle range in which a black display is ensured) when the liquid crystal panel is in actual use. This is because the black secure region that is too large reduces brightness in a white display. Thus, the black secure region that is too large or too small is not preferable.

Specifically, when the limit of the black secure region (maximum angle of black secure region) is less than 97°, a black display appears noticeably insufficient depending on the angle by which the liquid crystal panel is observed, i.e., light leaks through a black display. Whereas the limit of the black secure region exceeding 106° would cause a reduction in brightness in a white display. Thus, apparently, the limit of the black secure region is preferably set within the range of not less than 97° and not more than 106°.

Thus, in the liquid crystal panel of FIG. 1, the conditions in which the limit of the black secure region falls within the above range when the tilt angle of the reflection plane 10 and the refractive index n1 of the leveling film 8 are varied were determined. The results are shown in Table 1. Note that, Table 1 shows the limit (degree) of the black secure region with the tilt angle of the reflection plane 10 and the refractive index of the leveling film 8.

TABLE 1

|  |  | REFRACTIVE INDEX | | | | |
| --- | --- | --- | --- | --- | --- | --- |
|  |  | 1.34 | 1.4 | 1.5 | 1.6 | 1.7 |
| TILT ANGLE (DEGREE) | 19 | 76 | 79 | 84 | 89 | 93 |
|  | 19.5 | 78 | 81 | 86 | 91 | 95 |
|  | 19.9 | 79 | 82 | 87 | 92 | 96 |
|  | 20 | 79 | 82 | 87 | 92 | 97 |
|  | 20.5 | 80 | 84 | 89 | 94 | 98 |
|  | 20.9 | 81 | 85 | 90 | 95 | 100 |
|  | 22.4 | 85 | 89 | 94 | 100 | 105 |
|  | 24 | 90 | 93 | 99 | 105 | 111 |
|  | 25.9 | 95 | 99 | 105 | 111 | 118 |
|  | 26.4 | 96 | 100 | 107 | 113 | 119 |
|  | 28.1 | 101 | 105 | 112 | 119 | 126 |
|  | 29 | 103 | 108 | 115 | 122 | 129 |
|  | 29.5 | 104 | 109 | 116 | 124 | 132 |
|  | 29.7 | 105 | 110 | 117 | 124 | 132 |
|  | 29.9 | 106 | 110 | 118 | 125 | 133 |
|  | 30 | 106 | 110 | 118 | 126 | 134 |
|  | 30.5 | 107 | 112 | 120 | 127 | 136 |
|  | 31 | 109 | 113 | 121 | 129 | 138 |
|  | 31.5 | 110 | 115 | 123 | 131 | 140 |

Here, as the leveling film 8, commonly used films with the refractive indices n1 in the range of 1.34 to 1.7 were examined. It is clear from Table 1 that the tilt angle within the range of 20° to 30° would allow the limit of the black secure region to be set within the above range using any leveling films 8 having the above refractive indices.

Thus, in order to set the limit of the black secure region within the range of not more than 97° and not more than 106° using a commonly available leveling film 8, the tilt angle is set preferably within the range of not less than 20° and not more than 30°.

Note that, in the present example, an element (e.g., liquid crystal layer 1) for leveling the reflection plane 10, which is provided instead of the leveling film 8, is also called a leveling film 8 for convenience. Also, when the limit of the black secure region is within the range of not less than 97° and not more than 106°, the tilt angle satisfies the condition of not less than θ (see Equation 1) and less than 2×θ.

As described, in the liquid crystal panel as shown in FIG. 1, it is preferable that the tilt angle made by the reflection plane 10 with respect to the boundary plane 6a is within the range of not less than 20° and not more than 30°. By setting the tilt angle in this range, the range of black secure region can be optimized without using a material with a refractive index value which is not commonly employed, thus realizing desirable black and white displays.

EXAMPLE 4

In order to examine the effect of azimuth of external light which contributes to a white display in the liquid crystal panels as shown in FIG. 1, and FIG. 5(a) and FIG. 5(b), the luminance factor of a white display as viewed from the orthogonal direction (reception angle b=0°) when a voltage is applied to the liquid crystal layer 1 (at the time of perfect diffusion incidence) using the measuring system as shown in FIG. 3 was measured for each azimuth of the incident light. Note that, in the present example, the tilt angle of the reflection plane 10 was set at 30°, and as the leveling film 8 on the reflection plane 10, a film with a refractive index n1 of 1.33 was used.

Here, assuming that the upper side of the liquid crystal panel on the plane including the normal to the reflection plane 10 and normal to the reflection-side substrate 7 has an azimuthal angle "c"=0, light is incident from the projector 15 in directions at the azimuthal angles "c"=−90°, −45°, 0°, 45°, and 90° so as to measure the quantity of light received by the photo-receptor 16. The incident angle "a" of the incident light was varied from 0° to 80° at each azimuthal angle "c". The results are shown in FIG. 9.

FIG. 9 is a graph which shows a change in luminance factor as a function of the incident angle "a" at each azimuthal direction, in which abscissa indicates incident angle "a" and ordinate indicates luminance factor (i.e., a ratio with respect to a perfect diffusion reflecting plate) as received by the photo-receptor 16 in the orthogonal direction (reception angle "b"=0°) when the light is incident at each azimuth. Also, curves 9-1, 9-2, 9-3, 9-4, and 9-5 indicate the case in which the light is incident by the projector 15 in directions at the azimuthal angles of −90°, −45°, 0°, 45°, and 90°, respectively.

The results show that the luminance factor exceeds 3 when the light is incident from the projector 15 in a direction (upper side of the liquid crystal panel) at the azimuthal angle "c" of around 0° and in a direction at the incident angle "a" of around 70° of the present liquid crystal panel, making great contribution to a white display.

Under the condition of the present liquid crystal panel in actual use, the incident direction of external light incident on the liquid crystal panel varies depending on the position of an illumination, etc. Thus, a white display can be made brighter and a display quality of the liquid crystal panel can be improved by providing a mechanism which can adjust the direction of the reflection plane 10 on the liquid crystal panel, by which the direction of the reflection plane 10 is adjusted in an optimum direction depending on the environment in which the liquid crystal panel is used.

EXAMPLE 5

In Example 5, the azimuthal angle dependence of projection axis on reflection luminance factor was measured in the liquid crystal display device of FIG. 1 as manufactured under the above conditions, using the measuring system used in Example 1.

In the present Example, the tilt angle of the reflection plane 10 is set at 30°, and the reflection plane 10 formed on the reflection-side substrate 7 is structured to have a shape which perpendicularly extends out of the plane of the paper, and a consideration was given to two cases as indicated in FIGS. 5(a) and (b) and FIGS. 10(a) and (b).

Here, the configuration as shown in FIGS. 5(a) and (b) is the same as that of Example 1. The configuration as shown in FIGS. 10(a) and (b) is such that a hexagonal cone with a hexagonal bottom face and side faces at a 30° angle with respect to the bottom face is arranged in such a manner that the apex points towards the reflection-side substrate 7 and the bottom face is parallel to the reflection-side substrate 7, and three continuous side faces of the hexagonal cone are made to constitute reflection planes (sub-reflection planes) 10a, 10b, and 10c, and the remaining three side faces are made to constitute light absorbing layers 11a, 11b, and 11c, which configuration is densely packed as a minimum unit on a plane. Further, the configuration is arranged so that the regular projection of the normal vector of the reflection plane 10b on the boundary plane 6a is on the upper side of the liquid crystal panel.

Thus, while the normal vector of the reflection plane 10 directs in a uniform direction when the reflection plane 10 (reflecting plate) is configured as sown in FIGS. 5(a) and (b), the normal vector directs in multiple directions (in three directions in the case of FIGS. 10(a) and (b) ) when the reflection plane 10 is configured as shown in FIGS. 10(a) and (b).

Figure 11:
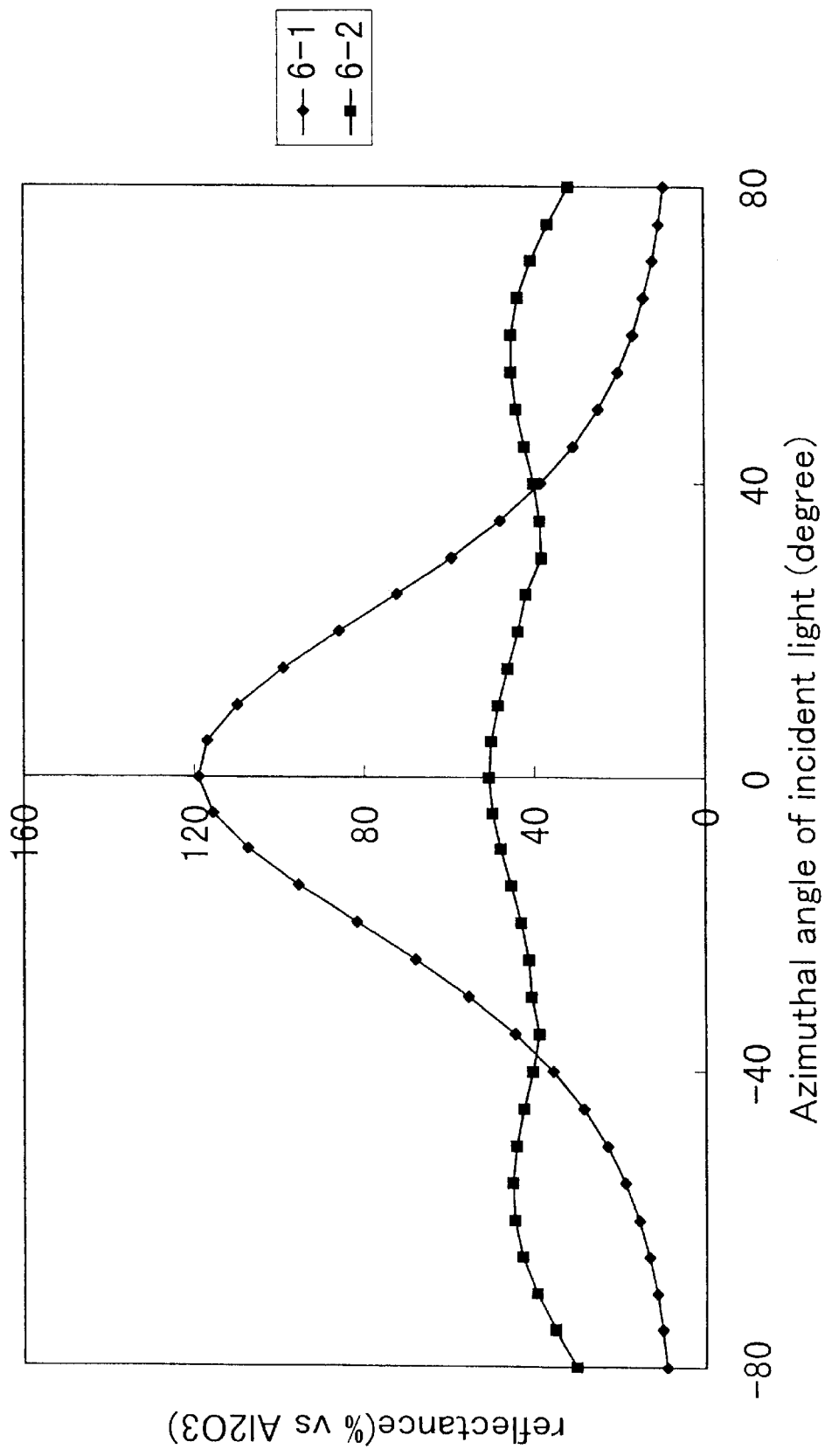
FIG. 11 is a drawing showing a relationship between an incident polar angle and a luminance factor in a white display of the reflection-type liquid crystal display device in accordance with the First Embodiment when a viewing direction is an orthogonal direction and an incident direction is on the upper side of the reflection-type liquid crystal display device.
Figure 12B:
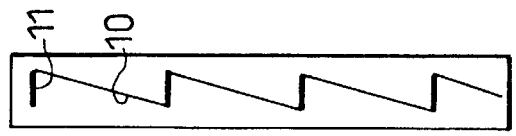
FIG. 12(b) is a cross section of FIG. 12(a) taken along the line D—D.
Figure 12C:
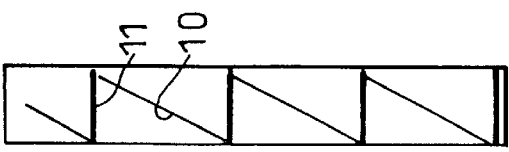
FIG. 12(c) is a cross section of FIG. 12(a) taken along the line E—E.
Figure 12A:
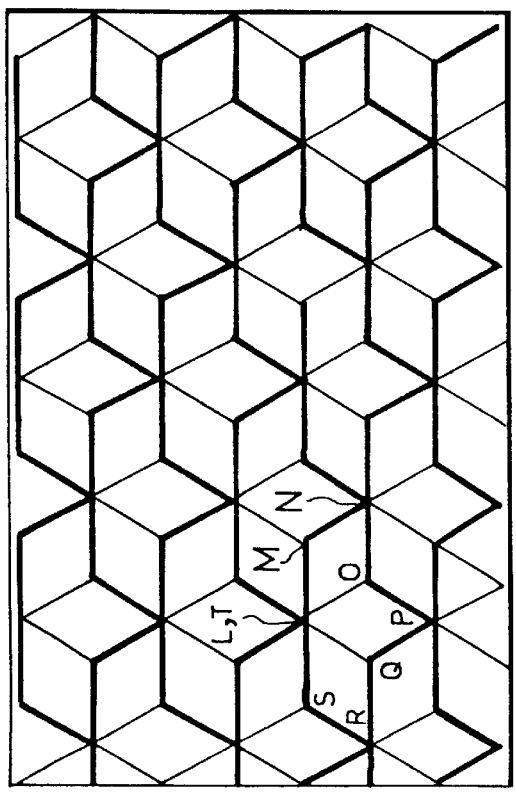
FIG. 12(a) is a plan view of yet another reflection plane and light absorbing layer of the reflection-type liquid crystal display device in accordance with the First Embodiment.
Figure 12E:
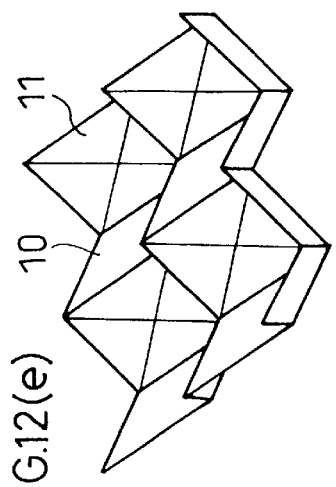
FIG. 12(e) is a perspective view of the partial reflection plane and light absorbing layer of FIG. 12(d) in combination.
Figure 12D:
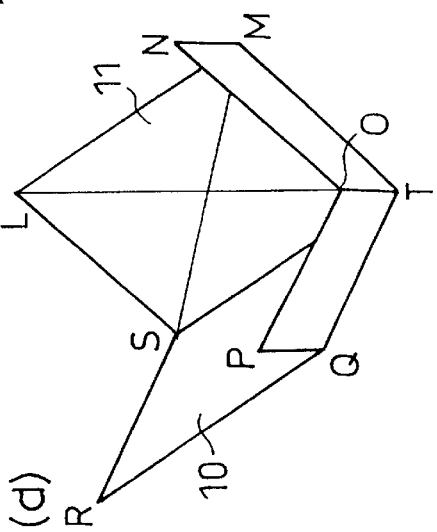
FIG. 12(d) is a partial perspective view of the reflection plane and light absorbing layer of FIG. 12(a)

First, when the plane made by the normal to the inclined reflection plane 10 (reflection plane 10b in FIG. 10(a) ) and normal to the reflection-side substrate 7 is positioned parallel to the direction of the azimuthal angle "c"=0 (upper side of the liquid crystal panel is in the direction at the azimuthal angle "c"=0), the incident angle "a" was varied from 5° to 85° at 5° intervals while fixing the incident direction of light at the azimuthal angle "c"=−80°. Here, while fixing the reception angle "b" at 0°, the reflection gain (relative reflection luminance factor when a reflection luminance factor of a standard white plate (perfect diffusion reflecting plate) made of alumina is 1) characteristic in the incident angle direction of the reflection-type liquid crystal display device was measured and the average value was calculated. The same measurement was also made while varying the azimuthal angle "c" up to 80° at 5° intervals. FIG. 11 shows the results when the reflection plane 10 was configured as shown in FIGS. 5(a) and 5(b) (curve 11-1) and as shown in FIGS. 10(a) and (b) (curve 11-2).

As is clear from the measurement results, the effect of light incident direction (azimuthal angle direction) on reflection gain is smaller in the configuration of the reflection plane 10 as shown in FIGS. 10(a) and (b). From this it was found that by having anisotropy in a direction of the normal vector of the reflection plane (azimuthal angle direction in particular), the present reflection-type liquid crystal display device is less affected by the azimuth of incident light.

Namely, it became possible to make a use of light which is incident on the liquid crystal panel in arbitrary directions, thus uniformly improving the reflection luminance factor irrespective of the direction of incident light.

As described, there are two ways to configure the inclined plane 9a (configuration of reflection plane 10 and light absorbing layer 11) formed on the reflection-side substrate 7 of the present Example. However, parameters such as a combination of the reflection plane 10 and the light absorbing layer 11, and a direction of a normal vector of each plane may be appropriately selected and used with respect to a unit structure of the inclined plane 9a formed on the reflection-side substrate 7.

The scattering efficiency of back scattering in the liquid crystal layer 1 is smaller than the scattering efficiency of forward scattering, and thus the main component of reflected light is the component of forward scattered light which has been reflected off the reflection plane 10 while some of which have been further scattered so as to be emanated in the viewing direction. That is, it is advantageous to have a configuration of the reflection plane which prevents direct viewing of the light absorbing layer 11 when the reflection-side substrate 7 is viewed in the viewing direction. For example, the densely packed configuration as shown in FIGS. 12(*a*) through 12(*e*) is available, in which three kinds of anisotropies are given for normal vectors of the planes of the reflection plane 10 in the azimuthal angle direction, and a normal vector of the layer of the light absorbing layer 11 is made parallel to the panel.

The following describes the configuration as shown in FIGS. 12(*a*) through 12(*e*), in which FIG. 12(*a*) is a plan view of another reflection plane 10 and light absorbing layer 11 of the reflection-type liquid crystal display device in accordance with the present embodiment; FIG. 12(*b*) is a cross section of FIG. 12(*a*) taken along the line D—D; FIG. 12(*c*) is a cross section of FIG. 12(*a*) taken along the line E—E, FIG. 12(*d*) is a partial perspective view of the reflection plane 10 and light absorbing plane 11 of FIG. 12(*a*); and FIG. 12(*e*) is a perspective view of a partial combination of the reflection plane 10 and light absorbing plane 11 of FIG. 12(*d*). In FIGS. 12(*a*) and 12(*b*), corresponding apices are denoted by the symbols L to T.

Here, the plane containing apices L, M, S, and T (plane containing x in FIGS. 12(*d*) and 12(*e*)) is perpendicular to the reflection-side substrate 7 (see FIG. 1), and it constitutes the light absorbing layer 11. The planes containing apices M, N, O, and T, apices O, P, Q, and T, and apices Q, R, S, and T, respectively, are equivalent diamonds, and they constitute the reflection plane (sub-reflection plane) 10. The reflection plane 10 is positioned such that the normal vectors of each reflection plane 10 are in different directions.

As described, by the present invention, a reflection-type liquid crystal display device with high reflectance and high contrast was obtained. Further, compared with the conventional system, wavelength dependence is smaller and there is a significant improvement in chromatic characteristics.

The plane of the reflecting plate where the reflection plane 10 is to be formed may be provided on the outer sides of the pair of substrates 6 and 7 sandwiching the liquid crystal layer 1, by which productivity can be improved. Alternatively, the plane of the reflecting plate where the reflection plane 10 is to be formed may be provided on the pair of substrates 6 and 7 on the side of the liquid crystal layer 1, by which a desirable display without parallax can be realized.

Further, by employing a color filter which has been adjusted to have high brightness in the present reflection-type liquid crystal display device, a color reflection-type liquid crystal display device with desirable color reproducibility and high display quality can be realized. Also, an input device integrated-type liquid crystal display device can be realized without losing its display quality when the reflection-type liquid crystal display device of the present invention is used in conjunction with a touch panel.

As described, the reflection-type liquid crystal display device of the present embodiment includes a pair of substrates (substrates 6 and 7, or 6 and 24); a liquid crystal layer 1 sandwiched between the pair of substrates (substrates 6 and 7, or 6 and 24) ; and a reflection plane 10 provided at least partially on one of the pair of substrates (reflection-side substrate 7) or at least partially on a substrate (reflection-side substrate 7) adjacent to one of the pair of substrates (substrate 24), the reflection plane 10 being inclined toward an opposite side of an user, the reflection-type liquid crystal display device being preferably arranged such that an inner product of (a) a regular projection vector of a normal vector of the reflection plane 10 onto a display plane and (b) a regular projection vector of a vector in a direction from the reflection-type liquid crystal display device toward the user is not more than 0, and a tilt angle made by at least a portion of the reflection plane 10 with respect to a horizontal plane of the pair of substrates 6 and 7 is not less than θ and less than 2×θ as defined by the Equation (1).

Further, in addition to this arrangement, it is preferable that a portion of the substrate having the reflection plane 10 where the reflection plane 10 is not provided has a light absorbing property or a light guiding property to a portion having a light absorbing property.

With this arrangement, a desirable black display in a viewing direction of the user can be realized in the reflection-type liquid crystal display device in the transmissive state.

Further, in addition to the above arrangements, it is preferable that a normal vector of the inclined plane 9*a* having the reflection plane 10, provided on the substrate (reflection-side substrate 7) having at least partially the reflection plane 10 directs not in one direction but in multiple directions.

With the above arrangements, more external light incident on the reflection-type liquid crystal display device can be utilized, realizing a white display with higher brightness and with less dependence on incident light directions.

In order to obtain a further desirable white display, it is preferable in addition to the above arrangements that a leveling film 8 having transmissivity is provided on the reflection plane 10 of the substrate (reflection-side substrate 7) having at least partially the reflection plane 10.

With this arrangement, the tilt angle of the reflection plane 10 can be made smaller and the scattering light can be used more efficiently when the liquid crystal layer 1 is in the scattering state. Also, by the leveling process using the leveling film 8, an improvement in aligning ability of the liquid crystal can be expected.

Further, in addition to the above arrangements, it is preferable that the pair of substrates (substrates 6 and 24) are both transmissive, and there is separately provided a substrate (reflection-side substrate 7) having at least partially the reflection plane 10, which substrate may be externally provided.

With this arrangement, a TFT substrate (substrate 24) and the reflecting substrate (reflection-side substrate 7) can be manufactured in separate steps, thus improving productivity.

It is further preferable that the liquid crystal layer 1 is a scattering liquid crystal layer, and display is carried out by switching of an incident light transmissive state and an incident light scattering state of the liquid crystal layer 1.

With this arrangement, switching of a black display and white display can be made by switching the incident light transmissive state and incident light scattering state by the scattering liquid crystal layer.

Namely, in a black display, incident light on the scattering liquid crystal layer is allowed to transmit, and by the effect of the reflection plane 10 a desirable black display can be realized. In a white display, incident light on the scattering liquid crystal layer is scattered, and the light which was scattered forward and reflected off the reflection plane contributes to a white display in addition to the back scattered light, thus realizing a desirable white display.

Further, with the above arrangement, a black display and white display can be carried out without a polarizing plate. In a white display in particular, a reduction in utilizing efficiency by the polarizing plate can be avoided, and a further desirable white display can be obtained. Thus, in the present reflection-type liquid crystal display device, a display quality can be improved.

It is further preferable that the inclined direction of the reflection plane 10 is rotatable within a plane parallel to the incident-side substrate 6.

With this arrangement, because the inclined direction of the reflection plane 10 can be rotated within the plane parallel to the incident-side substrate 6, the inclined direction of the reflection plane 10 can be optimally adjusted in accordance with the luminance distribution of external light incident on the present reflection-type liquid crystal display device. That is, by adjusting the inclined direction to use external light most efficiently, the brightness in a white display can be improved. Here, the inclined direction of the reflection plane 10 may be rotated integrally with the substrate (reflection-side substrate 7) provided with the reflection plane 10, or by the reflection plane 10 itself.

As a result, the present reflection-type liquid crystal display device can carry out a desirable display in accordance with the environment in which the device is used.

It is further preferable that the liquid crystal layer 1 is divided into pixels as a minimum unit of display, and the pitch of the reflection plane 10 is no larger than the pixel pitch.

With this arrangement, because the pitch of the reflection plane 10 is no larger than the pixel pitch, even when there is a defect on the reflection plane 10 in the manufacturing step, the adverse effect of such a defect which might have on a display can be reduced.

For example, when the reflection plane 10 is to be formed by vapor deposition of aluminium, aluminium vapor-deposited on the apex portion of the reflection plane 10 can cause scattering of light. Further, a dent on the reflection plane 10 is often not vapor-deposited, and this portion appears black in a white display.

When the pitch of the reflection plane 10 is larger than the pixel pitch, the adverse effect of such a defect on a display quality is easily recognized by visual inspection, and the image quality is significantly impaired. Thus, in the present reflection-type liquid crystal display device, by the described arrangement, the spacial frequency of the reflection plane 10 is increased to prevent the configuration of the reflection plane 10 from being recognized by visual inspection, and thus a desirable display quality can be obtained even when there is a defect in the manufacturing process.

[Second Embodiment]

Figure 13:
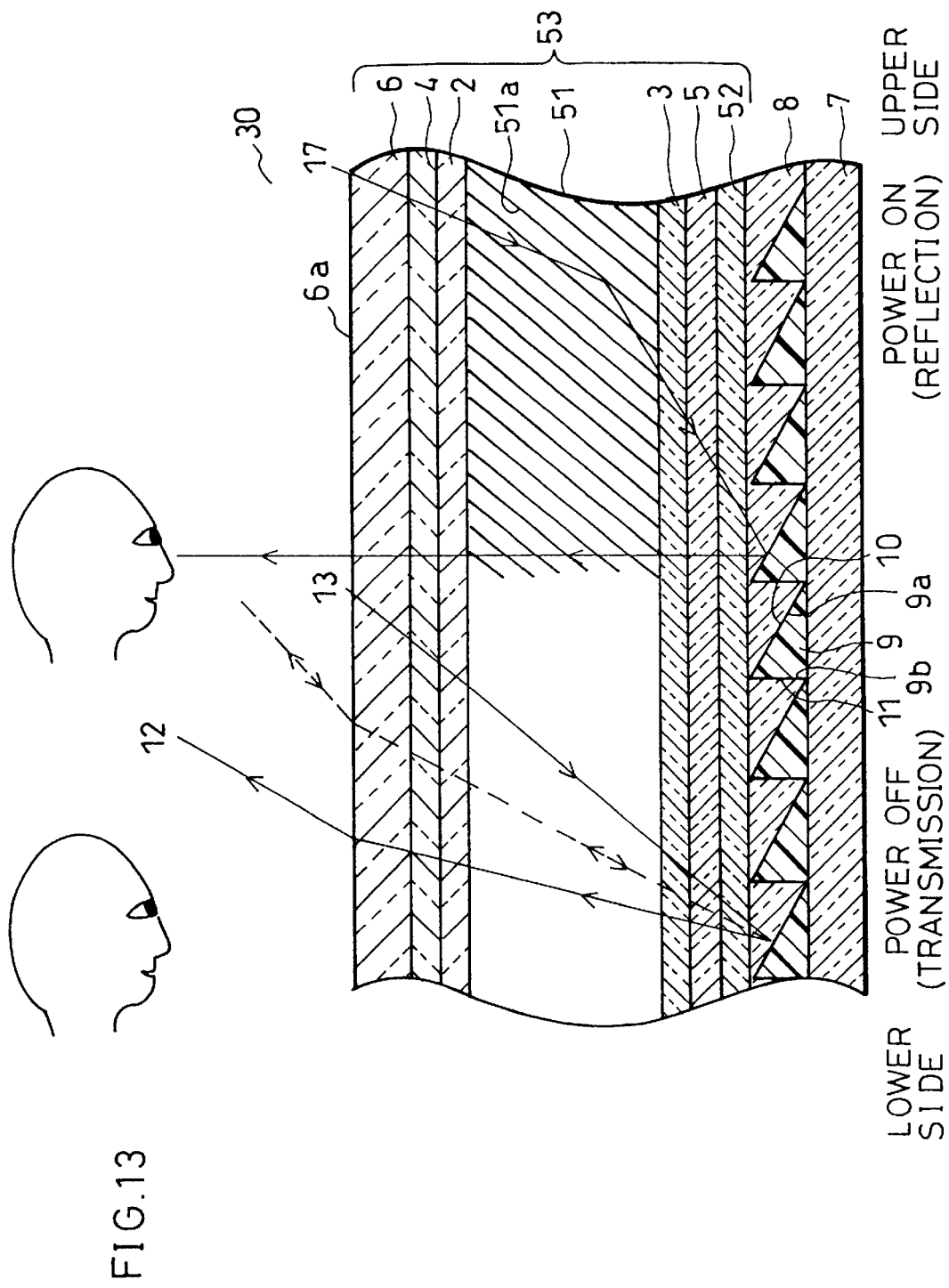
FIG. 13 is a cross sectional view showing a structure of a reflection-type liquid crystal display device in accordance with the Second Embodiment of the present invention.
Figure 14:
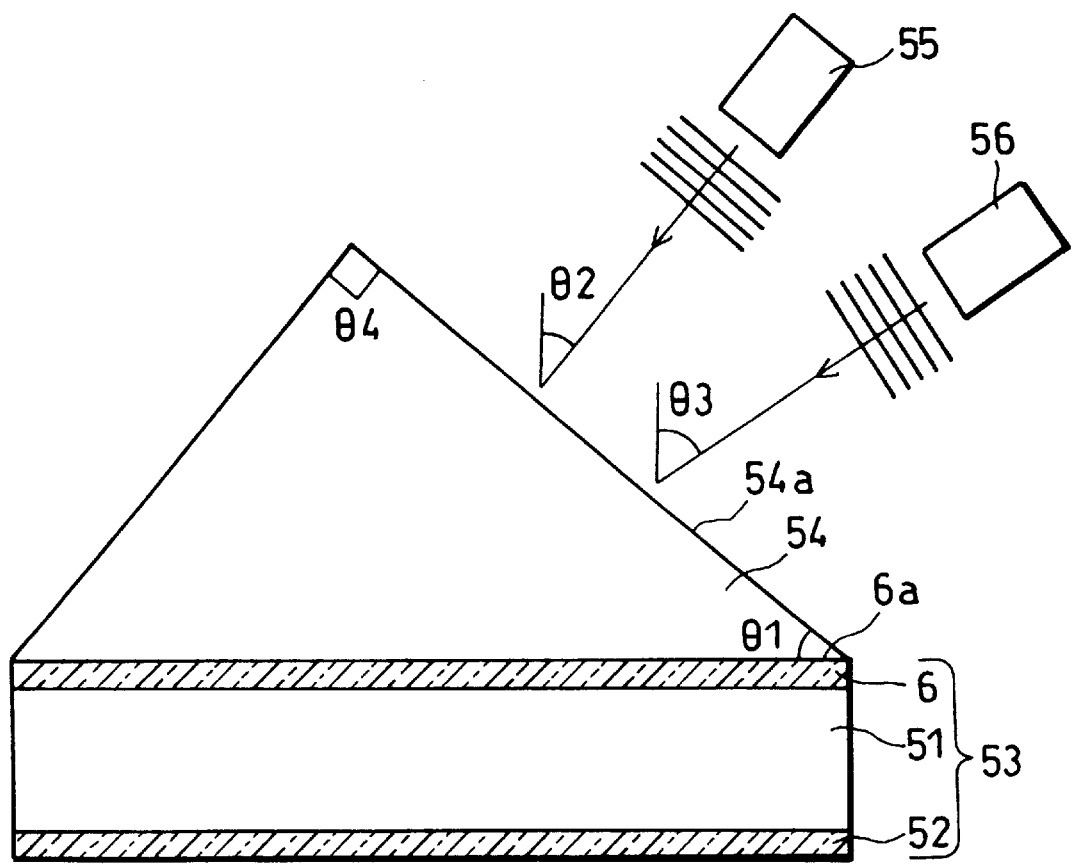
FIG. 14 is a cross sectional view showing steps of forming a multi-layered structure of the reflection-type liquid crystal display device in accordance with the Second Embodiment.

The following will describe Second Embodiment of the present invention referring to FIG. 13 and FIG. 14.

FIG. 13 is a cross section of a reflection-type liquid crystal display device (mainly liquid crystal panel portion) in accordance with the Second Embodiment of the present invention. The liquid crystal panel of the present embodiment is the same as that of the First Embodiment except a liquid crystal layer 51 and an intermediate substrate 52, and constituting elements the same as those described in the First Embodiment are given the same reference numerals and explanations thereof are omitted here. Note that, the electrodes 5 and horizontal alignment film 3 provided on the leveling film 8 in the liquid crystal panel of the First Embodiment are provided on the intermediate substrate 52 in the present liquid crystal panel.

Here, the liquid crystal layer 51 is composed of a dispersion of a liquid crystal composite of a low molecular weight and an aligning polymer which was obtained by fixing its liquid crystalline alignment.

First, a liquid crystal layer base material was prepared by mixing a liquid crystal composite of positive dielectric anisotropy, a pre-polymer material, and a polymerization initiator. The liquid crystal composite used herein is a liquid crystal composite which is commonly used in a common TFT liquid crystal panel, and TL-213 (Registered Trade Mark in Japan, provided by Merck & Co., Inc.) was used in the present embodiment. The pre-polymer material shows a liquid crystal property at ordinary temperature, and maintains its liquid crystal alignment as a polymer after polymerization. The mixing ratio of the components of the liquid crystal layer base material was liquid crystal composite pre-polymer material polymerization initiator of 80:19:1 by weight ratio.

Then, the liquid crystal layer base material was held between the incident-side substrate 6 and intermediate substrate 52 to have the liquid crystal layer 51 in a thickness of 5 $\mu$m, thus forming a liquid crystal complex 53. The intermediate substrate 52 is provided for holding the liquid crystal layer 51 instead of the reflection-side substrate 7 having the reflection plane 10 so that the light is not reflected unnecessarily in a laser projecting step to be described later.

Then, a projection of a laser was conducted on the liquid crystal layer (liquid crystal layer base material) 51 based on the arrangement as shown in FIG. 14. FIG. 14 is a cross sectional view which depicts a laser projecting method in the manufacturing steps of the present liquid crystal panel. Note that, in FIG. 14, the electrodes 4 and 5, horizontal aligning films 2 and 3, and other components are omitted for simplification.

For the laser projection, a prism 54 and argon lasers 55 and 56, for example, having an in-phase wavelength of 488 nm were used. The prism 54 is a triangular prism with a cross sectional shape of a right triangle having the apex angle θ1 of 40° and θ4 of 90°, and the plane opposite to apex angle θ4 was positioned adjacent to the incident-side substrate 6 (boundary plane 6a) of the liquid crystal complex 53, and the plane between apex angles θ1 and θ4 was provided as a projection plane 54a of laser beams.

Then, the laser beams (parallel rays) from the argon lasers 55 and 56 were incident on the projection plane 54a in two directions at angles θ2 (40°) and θ3 (55°), respectively, with respect to a normal direction of the boundary plane 6a.

As a result, interference of the laser beams occurred, and an interference pattern with varying intensity of the laser beams at specific intervals d was obtained. This varying intensity of the laser beams is generated at small intervals which are determined by the wavelength and incident angles of the two beams.

Here, when the liquid crystal layer base material contains a light curable polymer material, the light curable polymer material is cured at a band of strong intensity in the interference pattern. When the liquid crystal base material contains a heat curable polymer material (e.g., epoxy resin), heat is generated at a band of strong intensity in the interference pattern and the heat curable polymer material is cured. Thus, in either case, the liquid crystal is concentrated in a band of weak light intensity in the interference pattern. Here, the light curable polymer material is used.

As a result, there was obtained the liquid crystal layer 51 having a fine multi-layer structure (layer structure) with separated layers of a liquid crystal composite layer containing only liquid crystal or a large amount of liquid crystal, and a polymer material layer containing only polymer material (liquid crystal dispersion medium) or a large amount of polymer material. The regular projection of a normal vector of the plane of each layer constituting the multi-layer structure onto the boundary plane 6a is directed towards the lower side of the liquid crystal panel. Here, the optical characteristic of each layer material is set such that the liquid crystal layer 51 is optically isotropic under applied voltage, and that there will be a change in refractive index based on the multi-layered structure under no applied voltage.

The present liquid crystal panel was manufactured by placing the leveling film 8, object 9, and reflection-side substrate 7 on the liquid crystal complex 53 obtained in the described manner (FIG. 13).

The following will describe an operation of the present liquid crystal panel referring to FIG. 13.

When power is OFF (under no applied voltage), the liquid crystal layer 51 is in a transmissive state as noted above, and a desirable black display is obtained for the reasons as described in the First Embodiment.

When power is ON (under applied voltage), a white display is obtained in the following manner. As noted above, when the liquid crystal layer is under applied voltage, there generates a change in refractive index based on the multi-layered structure in the liquid crystal layer 51. At an interface 51a where the refractive index changes, the light is reflected, and in particular, the light which is incident at an acute incident angle with respect to the interface 51a (incident light, e.g., beam 17, which is incident at a wide angle with respect to a normal direction of the layers of the multi-layered structure) is totally reflected. Thus, the incident light is affected in such a way that the propagation direction thereof is deflected by the effect of this reflection.

When the interface 51a is provided with an angle of a predetermined range with respect to the boundary plane 6a, as exemplified by the beam 17, there will be light whose propagation direction is changed by the liquid crystal layer 51 and which is reflected off the reflection plane 10 to reach the viewer, thus obtaining a white display.

The multi-layered structure of the present liquid crystal panel is provided with a purpose which is different from that of a conventional liquid crystal panel for perpendicularly reflecting light which was perpendicularly incident on the liquid crystal panel, and the layer interval of the multi-layered structure can be made wide, by which the driving voltage can be reduced.

As described, the reflection-type liquid crystal display device of the present embodiment may have an arrangement wherein the liquid crystal layer 51 has a layer structure composed of a liquid crystal and a liquid crystal dispersion medium, and the liquid crystal layer carries out display by switching of an incident light transmissive state and an incident light reflecting state which is induced by the layer structure.

With this arrangement, the liquid crystal layer 51 has a layer structure composed of a liquid crystal and liquid crystal dispersion medium, and by switching of the incident light transmissive state and the incident light reflecting state as induced by the layer structure, corresponding switching of a black display and white display can be accomplished.

Namely, for a black display, incident light on the liquid crystal layer 51 is transmitted, and a desirable black display is realized by the effect of the reflection plane 10. For a white display, incident light is reflected by the layer structure to be incident on the reflection plane 10 at a different angle from that in the transmissive state so as to guide the light in the viewing direction, thus realizing a desirable white display.

Further, with the described arrangement, a black and white displays can be carried out without a polarizing plate. In particular, in a white display, the polarizing plate induced reduction in utilizing efficiency of light can be prevented, and a further desirable white display can be obtained. As a result, a display quality can be improved in the present reflection-type liquid crystal display device.

[Third Embodiment]

Figure 15:
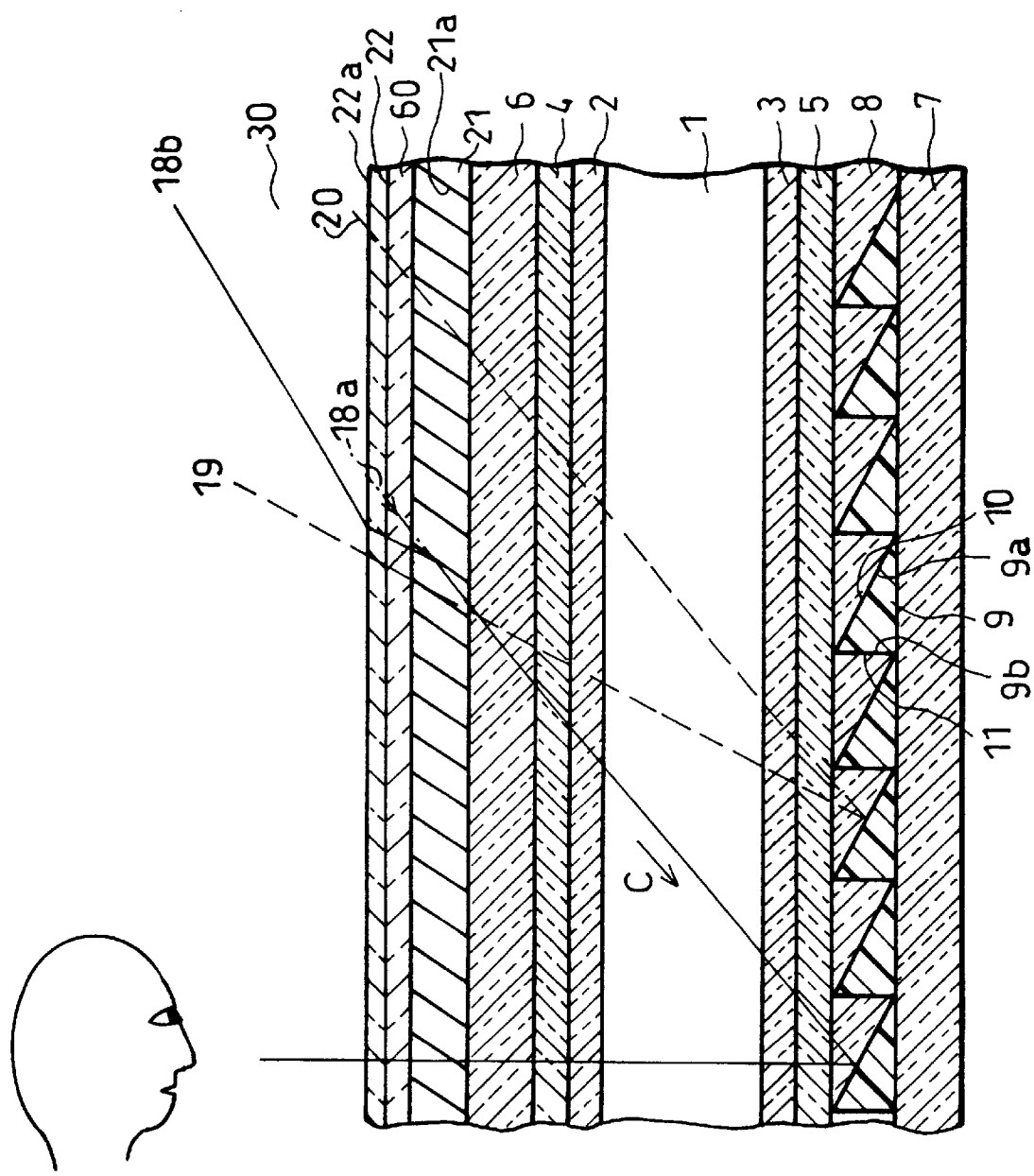
FIG. 15 is a cross sectional view showing a structure of a reflection-type liquid crystal display device in accordance with the Third Embodiment of the present invention.
Figure 16:
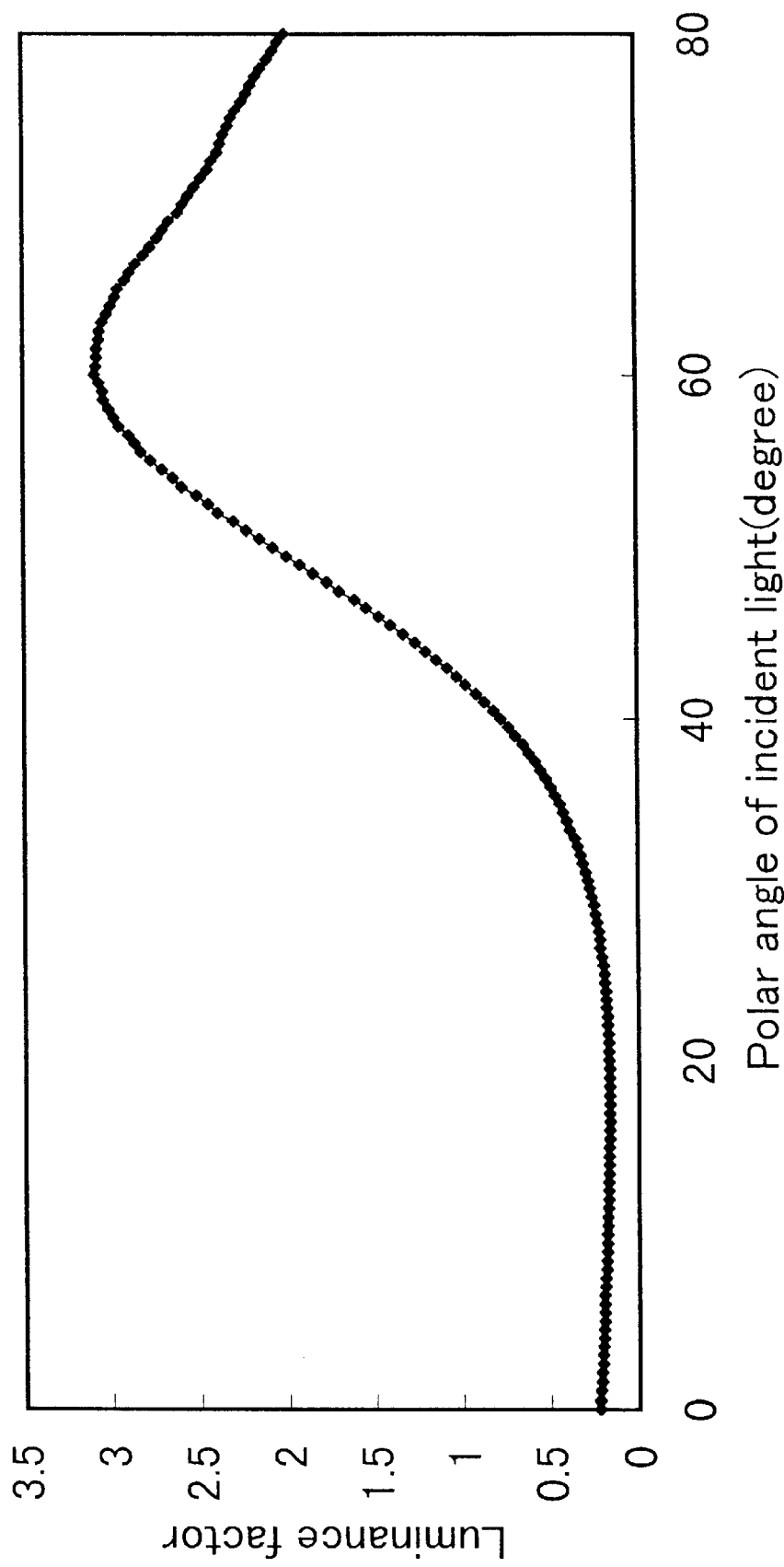
FIG. 16 is a graph showing incident angle direction dependence of a luminance factor in a white display of the reflection-type liquid crystal display device in accordance with the Third Embodiment.

The following will describe Third Embodiment of the present invention referring to FIG. 15 and FIG. 16.

FIG. 15 is a cross sectional view of a reflection-type liquid crystal display device (mainly liquid crystal panel portion) in accordance with the Third Embodiment of the present invention. The present liquid crystal panel is the same as that of the First Embodiment except an interference reflecting plate (reflector) 21 provided on the incident-side substrate 6 on the side of the air layer 30, an absorbing color filter 60, and a protective film 22, and those constituting elements the same as those described in the First Embodiment are given the same reference numerals and explanations thereof are omitted here. Note that, in the present liquid crystal display panel, a boundary plane 22a between the protective film 22 and the air layer 30 corresponds to the boundary plane 6a of the First Embodiment.

The interference reflecting plate 21 is a transmissive hologram interference plate composed of deposited high refractive index medium and low refractive index medium having relatively high and low refractive indices, respectively. The interference reflecting plate 21 has a layer plane 21a to be an interface of the deposited structure. Further, the interference reflecting plate 21 has the function of regularly reflecting only the light which is incident in a specific direction ("distinct direction" hereinafter) in accordance with a layer interval of the deposited structure with respect to the layer plane 21a.

Here, as such a specific direction, there are two directions which are in the relationship of regular reflection (symmetrical relationship with respect to a perpendicular to the plane) on one side of the layer plane 21a, and the directions symmetrical to these two directions with respect to the layer plane 21a on the other side of the layer plane 21a are also the specific directions. In the following, one of such specific directions, which is directed toward the reflection plane 10 from the layer plane 21a (direction as indicated by arrow C in FIG. 15) on the side of the boundary plane 22a will be regarded as a first distinct direction (specific direction).

Note that, in actual case, there is a range of incident directions of the light reflected by the layer plane 21a; however, in the present embodiment, since the effect of such a range is negligible, a direction in the middle of the range will be regarded as the distinct direction.

The following explanation is based on the case where the tilt angle of the reflection plane 10 is set at θ as given above. Note that, the present embodiment is not just limited by the tilt angle of θ, and the angle may be changed appropriately within the range which satisfies the tilt angle of the First Embodiment.

It is preferable that the angle made by the layer plane 21a of the interference reflecting plate 21 with respect to the boundary plane 22a and the angle made by the first distinct direction of the interference reflecting plate 21 with respect to the boundary plane 22a are set within the angle made by a reflection plane normal direction 19 with respect to the boundary plane 22a and the angle made by a critical angle direction (total reflection angle direction) 20 with respect to the boundary plane 22a. Note that, the reflection plane normal direction 19 is a normal direction of the reflection plane 10 and the critical angle direction 20 is a direction in which the light perpendicularly incident on the reflection plane 10 with respect to the liquid crystal layer 1 is regularly reflected off the reflection plane 10 when there is no reflection effect at the interference reflecting plate 21.

The following will describe an operation based on the case where the angle made by the layer plane 21a with respect to the boundary plane 22a is set to be an approximate median of the angle made by the reflection plane normal direction 19 and the critical direction 20 with respect to the boundary plane 22a, and the first distinct direction of the interference reflecting plate 21 is set in a direction which is slightly inclined toward the perpendicular direction with respect to the boundary plane 22a from the direction in which the light perpendicularly incident on the reflection plane 10 with respect to the liquid crystal layer 1 is regularly reflected off the reflection plane 10.

The following considers a light ray 18a which is incident on the boundary plane 22a from the upper side toward the lower side of the present liquid crystal panel. Here, the light ray 18a is subjected to the reflection effect of the interference reflecting plate 21 and is incident on the reflection plane 10 while being inclined toward the perpendicular direction with respect to the boundary plane 22a as compared with the case where the interference reflecting plate 21 is not provided (the case in First Embodiment). The light regularly reflected off the reflection plane 10 is emerges on the upper side of the liquid crystal panel.

The following considers a light ray 18b which, after incident on the boundary plane 22a from the upper side of the liquid crystal panel, is incident on the interference reflecting plate 21 in the distinct direction of the interference reflecting plate 21 (direction in the relationship of regular reflection with the first distinct direction). Here, the light ray 18b is subjected to the reflection effect of the interference reflecting plate 21 and is incident on the reflection plane 10 while being inclined toward a direction parallel to the boundary plane 22a as compared with the case where the interference reflecting plate 21 is not provided. The light regularly reflected off the reflection plane 10 emerges in a direction which is slightly inclined toward the upper side of the liquid crystal panel from the perpendicular direction with respect to the boundary plane 22a.

Namely, by the interference reflecting plate 21, the optical paths of the light rays 18a and 18b are switched. However, due to the property of the interference reflecting plate 21, the light other than the light rays 18a and 18b is not subjected to the reflection effect, and they travel as though the interference reflecting plate 21 was not provided.

Here, in a black display state, as with the case where the interference reflecting plate 21 is not provided, the light does not emerge in the viewing direction and a desirable black display is obtained.

On the other hand, in a white display state, the light ray 18b emerges in the optical path which is substantially in the viewing direction by the reflection effect of the interference reflecting plate 21, and thus more scattering light of the light ray 18b emerges in the viewing direction by the scattering effect of the liquid crystal layer 1 as compared with the case where the interference reflecting plate 21 is not provided, thus improving the brightness of a white display. This is because the light ray 18b is incident at a wider angle (smaller incident angle) with respect to the boundary plane 22a as compared with the light ray 18a, by which the quantity of light per unit area incident on the liquid crystal panel can be increased.

Note that, when using the interference reflecting plate 21, while it may be possible to have an arrangement to reflect light only from a distinct direction with respect to a specific wavelength range, it may be difficult to have setting in which the distinct direction is in a certain direction with respect to the entire visible light range. That is, there is a case where the distinct direction changes in accordance with the wavelength of the incident light on the interference reflecting plate 21.

In the event where the display characteristic is impaired by the change in distinct direction in accordance with the wavelength, the use of absorbing color filter 60 prevents such a problem. Namely, the light with a wavelength in a distinct direction other than desired distinct directions can be absorbed by the absorbing color filter 60. The absorbing color filter 60 may be provided as the protective film 22, for example.

In the liquid crystal panel in accordance with the present embodiment, a luminance factor of a white display as viewed in an orthogonal direction (reception angle b=0°) when a voltage is applied to the liquid crystal layer 1 (at the time of perfect diffusion incidence) was measured as with Example 4 using the measuring system of Example 1. Note that, the tilt angle of the reflection plane 10 and the refractive index n1 of the leveling film 8 used in this measurement were 30° and 1.33, respectively, as with Example 4.

Supposing that the upper side of the liquid crystal panel in the plane including the normal to the reflection plane 10 and normal to the boundary plane 22a is the direction of azimuth angle c=0, light was incident from the projector 15 (see FIG. 3) in a direction at the azimuth angle c=0, and the quantity of light fell on the photo-receptor 16 (see FIG. 13) was measured. The incident angle a of the incident light was varied from 0° to 80° at each azimuth angle c=0°.

The results are shown in FIG. 16. FIG. 16 is a graph showing the results of measurement on luminance factor (ordinate) dependence on incident angle "a" (abscissa) in the present liquid crystal panel.

Comparing curves 9-3 of FIG. 16 and FIG. 9, the value of incident angle "a" which gives the peak value of the luminance factor is smaller in the results of the present Example (FIG. 16). This means that the light incident at a relatively smaller incident angle contributed more to the white display. A smaller incident angle "a" would give a larger estimation area (incident light cross sectional area, i.e., the area produced by orthogonal projection of the light incident plane on a plane perpendicular to the propagation direction of the incident light), which is advantageous for a white display. Thus, a further desirable white display can be obtained in the present liquid crystal panel.

Also, the interference reflecting plate 21 can also be used as a color filter, which realizes a brighter display compared with the conventional absorbing color filter.

Further, the interference reflecting plate 21 may be rotatable. By making the interference reflecting plate 21 rotatable, it is possible to make an adjustment for efficiently picking up brightest external light in accordance with the distribution of the brightness of the external light incident on the present reflection-type liquid crystal display device, thereby further improving the brightness in a white display.

Note that, in the present embodiment, an element having an interference property was used as the element for deflecting a propagation direction of incident light in a certain direction. However, a study has confirmed that elements having a diffraction property or scattering property also improved a white display.

As described, in the reflection-type liquid crystal display device of the present invention, the interference reflecting plate 21 is provided on a substrate (incident-side substrate 6) which faces the reflection plane 10 via the liquid crystal layer 1, and the angle made by the specific direction with respect to the substrate (incident-side substrate 6) is preferably within the angle made by the propagation direction of the light perpendicularly incident on the substrate (incident-side substrate 6) and reflected by the reflection plane 10 with respect to the substrate (incident-side substrate 6) and the angle made by the normal direction of the reflection plane 10 with respect to the substrate (incident-side substrate 6).

With this arrangement, by the interference reflecting plate 21 (optical element having a function of deflecting a propagation direction of light incident from a specific direction), of the light incident on the liquid crystal layer 1, the light which was incident from a specific direction is reflected so as to deflect the propagation direction of the light. As a result, the direction in which the light incident from a specific direction merges from the reflection-type liquid crystal display device can be inclined more toward the perpendicular direction of the substrate (incident-side substrate 6), i.e., toward the viewing direction. Thus, the light incident in a specific direction contributes more to a white display, thereby improving the brightness of a white display.

Here, the specific direction is set between the propagation direction of the light reflected off the reflection plane 10 by being perpendicularly incident on the substrate (incident-side substrate 6) and a normal direction of the reflection plane 10. With this setting and the setting of the tilt angle of the reflection plane 10, the light does not emerge toward the opposite side of the inclined direction of the reflection plane 10, thus maintaining a desirable black display as above.

As the interference reflecting plate 21, for example, a hologram or lumisity may be used. When using a hologram, which utilizes a reflection function chiefly by interference, the hologram is only required to have a function of deflecting the propagation direction of the incident light from a specific direction in the described arrangement. Thus, in the above arrangement, unlike the art as disclosed in Japanese Unexamined Patent Publication No. 281477/1997 (Tokukaihei 9-281477), the hologram is not required to have a spectral function, nor does it require to have two kinds of holograms, thus having an advantage in manufacturing accuracy and cost.

Also, the interference reflecting plate 21 may be rotatable with respect to the substrate (incident-side substrate 6). With this arrangement, it is possible to make an adjustment for efficiently picking up brightest external light in accordance with the distribution of the brightness of the external light incident on the present reflection-type liquid crystal display device, thereby further improving the brightness in a white display.

Further, it is preferable that the absorbing color filter 60 is provided further where incident light on the interference reflecting plate 21 passes through.

For example, when using a hologram as the interference reflecting plate 21, while it may be possible to provide a hologram in such a manner to reflect light which was incident only in a certain direction with respect to a certain wavelength range, it may be difficult to provide a hologram to reflect light which was incident only in a certain direction with respect to the entire visible light range. Thus, the specific direction of the interference reflecting plate 21 may be changed depending on the wavelength of the light incident on the interference reflecting plate 21.

In such a case, the light outside the above wavelength range may be reflected when incident on the interference reflecting plate in a direction different from the above direction, and this causes an adverse effect on the display characteristics. This phenomenon can be eliminated with the described arrangement by which the light incident on the interference reflecting plate 21 is passed through the absorbing color filter 60 which absorbs the light outside the above wavelength range.

[Fourth Embodiment]

Figure 17:
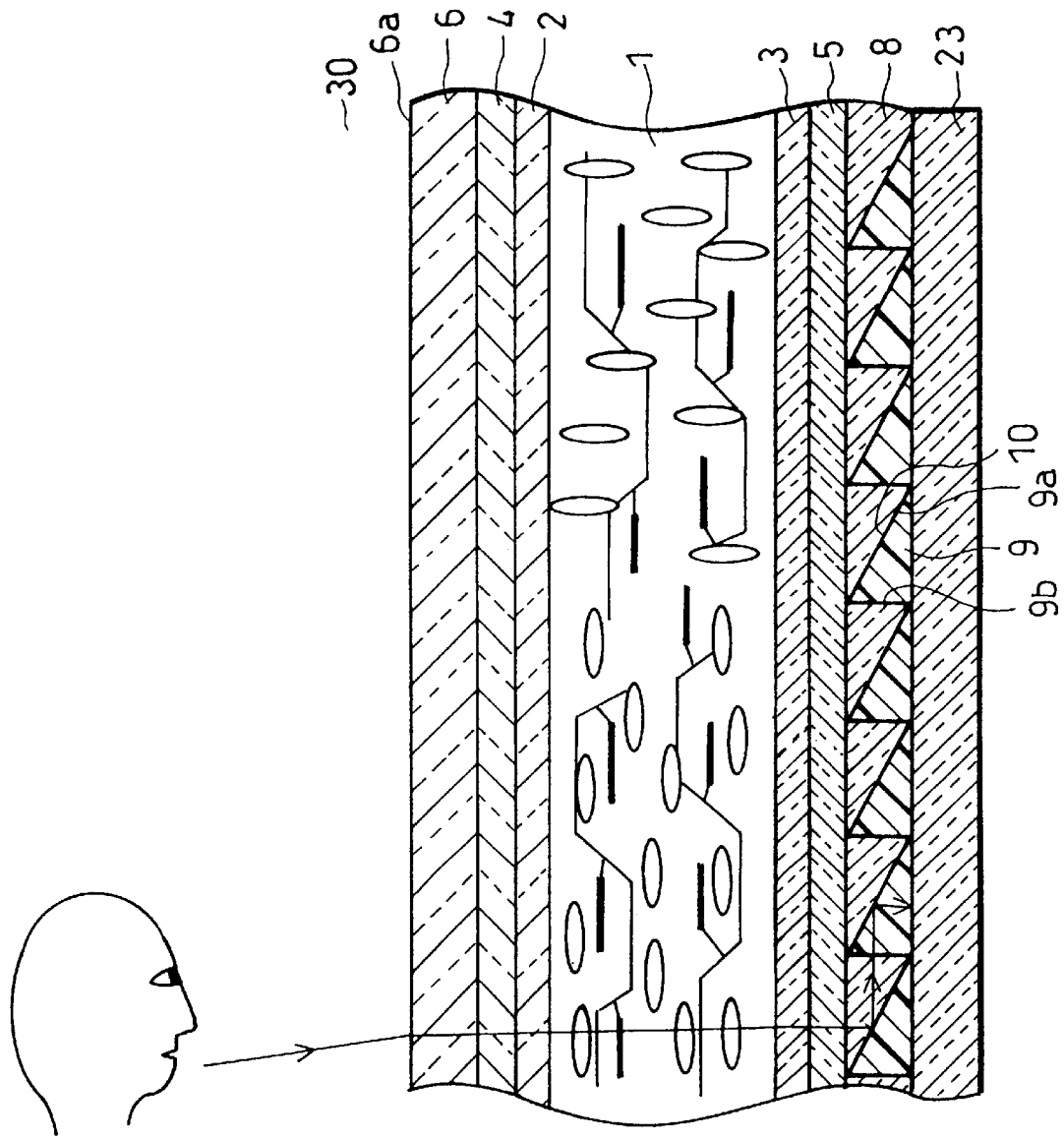
FIG. 17 is a cross sectional view showing a structure of a reflection-type liquid crystal display device in accordance with the Fourth Embodiment of the present invention.

The following will describe Fourth Embodiment of the present invention referring to FIG. 17.

FIG. 17 is a cross sectional view showing a structure of a reflection-type liquid crystal display device (mainly liquid crystal panel portion) in accordance with the present invention. Note that, those constituting elements the same as those described in the First Embodiment are given the same reference numerals and explanations thereof are omitted here.

The liquid crystal panel of FIG. 17 is the same as the liquid crystal panel of FIG. 1 except that the object 9 is made of a transparent material, that the light absorbing layer 11 is not formed on the object 9 and the perpendicular plane 9b is in a transmissive state, and that a solar cell 23 made from amorphous silicon semiconductor (here, with photoelectric transfer efficiency of 8%) is provided instead of the reflection-side substrate 7.

Because the object 9 is not provided with the light absorbing layer 11, the light incident on the perpendicular plane 9b from the leveling film 8, for example, such as the light ray 14 is incident on and into the object 9. The light incident on the object 9 reaches the solar cell 23 either directly or by being reflected off the back surface of the reflection plane 10. That is, the object 9 has a light guiding property for the solar cell 23. Thus, by projection of external light on the present liquid crystal panel, the external light is partially incident on the solar cell 23, activating the solar cell 23.

Here, the solar cell 23 has a light absorbing property, and is black which is sufficient enough to efficiently convert the light in the visible light range into an electromotive force, and has high absorbency. Thus, the solar cell 23 also serves as the light absorbing layer 11 of the First Embodiment.

The actual quantity of light which reaches the solar cell 23 was examined using the present liquid crystal panel. Here, the tilt angle of the reflection plane 10 was 25° and the refractive index of the leveling film 8 on the reflection plane 10 was 1.517, and when total scattering light was incident on the reflection-type liquid crystal display device, it was confirmed that substantially 60% of the incident light had been absorbed by the solar cell 23.

Here, assuming that the present liquid crystal panel is used outside, and that the energy density of the sun light is 100 $mW/cm^2$, since the efficiency of the solar cell 23 used in the present embodiment is 8%, when applied to a 10 inch display as measured diagonally, an output of 1.44 W is obtained.

As described, by the present embodiment, incident light on the present liquid crystal panel, which does not contribute to a white display, can be efficiently guided to the solar cell 23, making an efficient use of the light.

Obviously, the invention in accordance with the present embodiment can be modified within the range which preserves the above described functions. For example, in the present embodiment, the solar cell 23 made from an amorphous silicon semiconductor is used; however, not limiting to this, a solar cell 23 employing a compound semiconductor made of silicon compounds such as amorphous silicon, polycrystalline silicon, and monocrystal silicon, or the like, as well as gallium arsenide, etc., can also be used.

As described, the reflection-type liquid crystal display device has a light absorbing site which is preferably made up of the solar cell 23.

The solar cell 23 is colored black which is sufficient enough to efficiently convert light in the visible light range into an electromotive force. The described arrangement takes an advantage of this property and uses the solar cell 23 at the light absorbing site. Further, by placing the solar cell 23 beneath a display surface without providing an optical element having a light absorbency other than the solar cell 23, the area of the solar cell 23 can be increased and more incident light can be efficiently converted to an electric energy.

As described, in the present reflection-type liquid crystal display device, by integrating the solar cell 23 with the display device, the entire or partial power required for driving the display device can be supplied from the solar cell 23, thus reducing the space required for a power source and in turn reducing the size of the device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A reflection-type liquid crystal display device, comprising:
    a display plane on which light is incident;
    a-reflection plane for reflecting incident light, the reflection plane being positioned so as to face the display plane; and
    a liquid crystal layer provided between the display plane and the reflection plane,
    said reflection plane being inclined with respect to the display plane, and
    said reflection plane being rotatable within a plane parallel to the display plane.

2. A reflection-type liquid crystal display device, comprising:
    a pair of substrates;
    a liquid crystal layer sandwiched between the pair of substrates; and
    a reflection plane having a flat surface provided at least partially on one of said pair of substrates or at least partially on a substrate adjacent to one of said pair of substrates,
    a regular projection vector of a normal vector of said reflection plane onto a display plane being inclined upwards with respect to a user, wherein
    a tilt angle made by at least a portion of the reflection plane with respect to a horizontal plane of said pair of substrates being not less than $\theta$ and less than $2\times\theta$ as defined by an equation $$\theta = \tfrac{1}{2} \times \operatorname{arc\,sin}(n0/n1)$$

where n0 is a refractive index of atmosphere, and n1 is a refractive index of a substance for leveling an inclined plane; and
    there is no polarizer present or used,
    wherein said pair of substrates are both transmissive and the substrate having at least partially the reflection plane is an element which is externally provided and which is different from said pair of substrates.

3. A reflection-type liquid crystal display device, comprising:
    a pair of substrates;
    a liquid crystal layer sandwiched between the pair of substrates; and
    a reflection plane having a flat surface provided at least partially on one of said pair of substrates or at least partially on a substrate adjacent to one of said pair of substrates,
    a regular projection vector of a normal vector of said reflection plane onto a display plane being inclined upwards with respect to a user, wherein
    a tilt angle made by at least a portion of the reflection plane with respect to a horizontal plane of said pair of substrates being not less than $\theta$ and less than $2\times\theta$ as defined by an equation $$\theta = \tfrac{1}{2} \times \operatorname{arc\,sin}(n0/n1)$$

where n0 is a refractive index of atmosphere, and n1 is a refractive index of a substance for leveling an inclined plane; and there is no polarizer present or used,
    wherein a normal vector of the inclined plane having a reflection film, provided on the substrate having at least partially the reflection plane,
    wherein the reflection plane has multiple reflection planes which result in multiple normal regular vectors so that each regular normal vector directs in a single direction only, the single direction of the regular normal vectors being directed substantially upwardly but in different directions from each other.

4. The reflection-type liquid crystal display device, according to claim 3 further including:
    a regular projection vector of a normal vector of said reflection plane onto a display plane being inclined upwards with respect to a user, wherein
    a tilt angle made by at least a portion of the reflection plane with respect to a horizontal plane of said pair of substrates is not less than 20° and not more than 30° and no polarizer is present or used.

5. The reflection-type liquid crystal display device as set forth in claim 3, wherein a portion of the substrate having the reflection plane where the reflection plane is not provided has a light absorbing property or a light guiding property for a portion having a light absorbing property.

6. The reflection-type liquid crystal display device as set forth in claim 5, wherein the portion having the light absorbing property is a solar cell.

7. The reflection-type liquid crystal display device as set forth in claim 3, wherein the refractive index n1 is more than 1 and not more than 3.

8. The reflection-type liquid crystal display device as set forth in claim 3, wherein a transmissive highly refracting medium is provided on a reflection film of the substrate at least partially provided with the reflection plane.

9. A reflection-type liquid crystal display device, comprising:

a substrate including a boundary plane on which external light is incident;

a reflection plane for reflecting incident light; and a liquid crystal layer sandwiched between said substrate and said reflection plane, said reflection plane being positioned such that at least a portion of said reflection plane makes an angle of not less than $\theta$ and less than $2\times\theta$ with respect to said substrate, where $\theta$ is an angle made by said reflection plane with respect to the boundary plane when said reflection plane is positioned such that the incident light perpendicularly incident on the boundary plane of said substrate and reflected off said reflection plane is totally reflected at the boundary plane when the liquid crystal layer is in an transmissive state for the incident light wherein a regular projection vector of a normal vector of said reflection plane onto a display plane being inclined upwards with respect to a user and no polarizer is present or used, wherein said reflection plane includes a plurality of sub-reflection planes, and a normal vector of each of the sub-reflection planes directs in a single direction wherein the normal vectors direct upwardly and in different directions.

10. The reflection-type liquid crystal display device as set forth in claim 9, including a transparent film covering the reflection plane and having a surface which is leveled on a side of the liquid crystal layer.

11. The reflection-type liquid crystal display device as set forth in claim 9, including a light absorbing plane adjacent to the reflection plane.

12. The reflection-type liquid crystal display device as set forth in claim 11, wherein said light absorbing plane is perpendicularly provided with respect to the boundary plane.

13. The reflection-type liquid crystal display device as set forth in claim 9, wherein said liquid crystal layer is a scattering liquid crystal layer, and display is carried out by switching of an incident light transmissive state and an incident light scattering state of said liquid crystal layer.

14. The reflection-type liquid crystal display device as set forth in claim 9, wherein said liquid crystal layer has a layer structure composed of a liquid crystal and a liquid crystal dispersion medium, and said liquid crystal layer carries out display by switching of an incident light transmissive state and an incident light reflecting state which is induced by the layer structure.

15. The reflection-type liquid crystal display device as set forth in claim 9, wherein an inclined direction of the reflection plane is rotatable within a plane parallel to the substrate.

16. The reflection type liquid crystal display device as set forth in claim 9, wherein a reflecting medium for reflecting light incident in a specific direction is provided on the substrate facing the reflection plane via the liquid crystal layer, and an angle made by the specific direction with respect to the substrate is set within (a) an angle made by a propagation direction of light perpendicularly incident on the substrate and reflected off the reflection plane with respect to the substrate and (b) an angle made by a normal direction of the reflection plane with respect to the substrate.

17. The reflection-type liquid crystal display device as set forth in claim 16, wherein said reflecting medium is an interference reflecting plate, and an absorbing color filter is provided on the interference reflecting plate where incident light passes through.

18. The reflection-type liquid crystal display device as set forth in claim 9, wherein said liquid crystal layer is divided into pixels as a minimum unit of display, and a pitch for repetitively providing the reflection plane is not larger than a pixel pitch.

19. The reflection-type liquid crystal display device as set forth in claim 9, wherein a normal vector of said reflection, plane directs in a certain direction.

20. The reflection-type liquid crystal display device as set forth in claim 9, wherein said liquid crystal layer is made of polymer dispersed-type liquid crystal.

21. The reflection-type liquid crystal display device as set forth in claim 20, wherein said polymer dispersed-type liquid crystal is made of UV curable liquid crystal.

22. The reflection-type liquid crystal display device as set forth in claim 9, wherein said liquid crystal layer includes a liquid crystal composite and an aligned polymer which was obtained by fixing liquid crystalline alignment.

23. The reflection-type liquid crystal display device as set forth in claim 9, wherein said liquid crystal layer -includes a pre-polymer material and a polymerization initiator.

24. The reflection-type liquid crystal display device as set forth in claim 9, wherein said liquid crystal layer has a layer structure composed of a liquid crystal and a liquid crystal dispersion medium, and a change in refractive index due to the layer structure occurs in said liquid crystal layer in accordance with a voltage, applied to said liquid crystal layer.

* * * * *

UNITED STATES PATENT AND TRADEMARK OFFICE
CERTIFICATE OF CORRECTION

PATENT NO.     : 6,433,847 B1                                          Page 1 of 1
DATED          : August 13, 2002
INVENTOR(S)    : Kiyoshi Minoura It is certified that error appears in the above-identified patent and that said Letters Patent is hereby corrected as shown below:

Column 1,
Line 12, change "10 328808" to -- 11-328808 --

Signed and Sealed this

Twenty-fifth Day of February, 2003

JAMES E. ROGAN
*Director of the United States Patent and Trademark Office*